United States Patent [19]
Griffith et al.

[11] Patent Number: 5,914,020
[45] Date of Patent: Jun. 22, 1999

[54] ELECTRIC FIELD METHOD AND APPARATUS FOR DECONTAMINATING SOIL

[75] Inventors: Ronald J. Griffith, Wilmington, Del.; Richard Claude Landis, Lincoln University, Pa.; Dale Steven Schultz, Hockessin, Del.

[73] Assignee: E. I. du Pont de Nemours and Company, Wilmington, Del.

[21] Appl. No.: 08/767,262

[22] Filed: Dec. 13, 1996

Related U.S. Application Data

[63] Continuation-in-part of application No. 08/349,213, Dec. 5, 1994, Pat. No. 5,584,980.

[51] Int. Cl.$^6$ ....................................................... C25C 1/22
[52] U.S. Cl. .......................... 204/515; 588/204; 166/245; 166/248; 166/268; 166/276
[58] Field of Search .................................. 166/268, 276, 166/248, 245; 204/515; 588/204

[56] References Cited

U.S. PATENT DOCUMENTS

| | | | |
|---|---|---|---|
| 3,497,439 | 2/1970 | O'Bannon | 204/180 |
| 4,412,124 | 10/1983 | Kobayashi | 166/248 |
| 4,484,835 | 11/1984 | van Klinken | 405/52 |
| 4,582,611 | 4/1986 | Wang | 210/747 |
| 4,640,353 | 2/1987 | Schuh | 166/248 |
| 4,645,004 | 2/1987 | Bridges et al. | 166/248 |
| 4,664,560 | 5/1987 | Cortlever | 405/258 |
| 5,037,240 | 8/1991 | Sherman | 405/128 |
| 5,074,986 | 12/1991 | Probstein et al. | 204/130 |
| 5,137,608 | 8/1992 | Acar et al. | 204/130 |
| 5,190,628 | 3/1993 | Bibler | 204/182.4 |
| 5,213,449 | 5/1993 | Morris | 405/232 |
| 5,240,570 | 8/1993 | Chang et al. | 204/130 |
| 5,266,213 | 11/1993 | Gillham | 210/747 |
| 5,362,394 | 11/1994 | Blowes et al. | 210/617 |
| 5,398,756 | 3/1995 | Brodsky et al. | 166/248 |
| 5,433,829 | 7/1995 | Pool | 204/130 |
| 5,476,992 | 12/1995 | Ho et al. | 588/204 |

FOREIGN PATENT DOCUMENTS

| | | |
|---|---|---|
| 0 504 551 | 9/1992 | European Pat. Off. . |
| 5-336842 | 12/1993 | Japan . |
| 2 255 087 | 10/1992 | United Kingdom . |

OTHER PUBLICATIONS

Probstein, R.F., "Fundamental Aspects of Removing Hazardous Materials from Soils by Electric Fields", *EPRI Project 8060 Proceedings*, Paper #5, Jul. 1994.

Acar, Y.B. et al, "Principles f Electrokinetic Remediation", *Enviorn. Sci. Technol.*, 27(13), 2638–2650, (1993).

Trombly, J., "Electrochemical Remediation Takes to the Field", *Enviorn. Sci. Technol.*, 28(6), 289A–291A, (1994).

Hydraway® Drain Catalog (Subsurface Geocomposite Drainage Systems), MCHW–3001, Monsanto Chemical Company, 2381 Centerline Industrial Dr., St. Louis, MO 63146.

Hydraway® Drain Catalog (Subsurface Geocomposite Drainage Systems), HW–9–004, Monsanto Chemical Company, 2381 Centerline Industrial Dr., St. Louis, MO 63146.

Ho, S., "Development of an Integrated in–situ Remediation Technology", Morgantown Energy Technology Center, Sep. 1994.

Bryda et al., "Recent Developments in Cleanup Technologies", *Remediation/Winter 1994/95*, 5(1), 137–148, 1994.

Ho, S. et al., "Integrated In Situ Soil Remediation Technology: The Lasagna Process", *Environmental Science & Technology*, 29(10), 2528–2534, 1995.

LORESCO® Earth Contact Backfill, SC–3, Super–Conducting Premium Earth Contact Backfill, Hattiesburg, MS.

*Primary Examiner*—Arun S. Phasge

[57] ABSTRACT

Disclosed is an electrokinetic soil decontamination system that uses special electrode wall configurations, treatment wall configurations, and a combination electrode/treatment wall. A special emplacement method for all the flowable wall materials is used and special wall material compositions are disclosed.

10 Claims, 14 Drawing Sheets

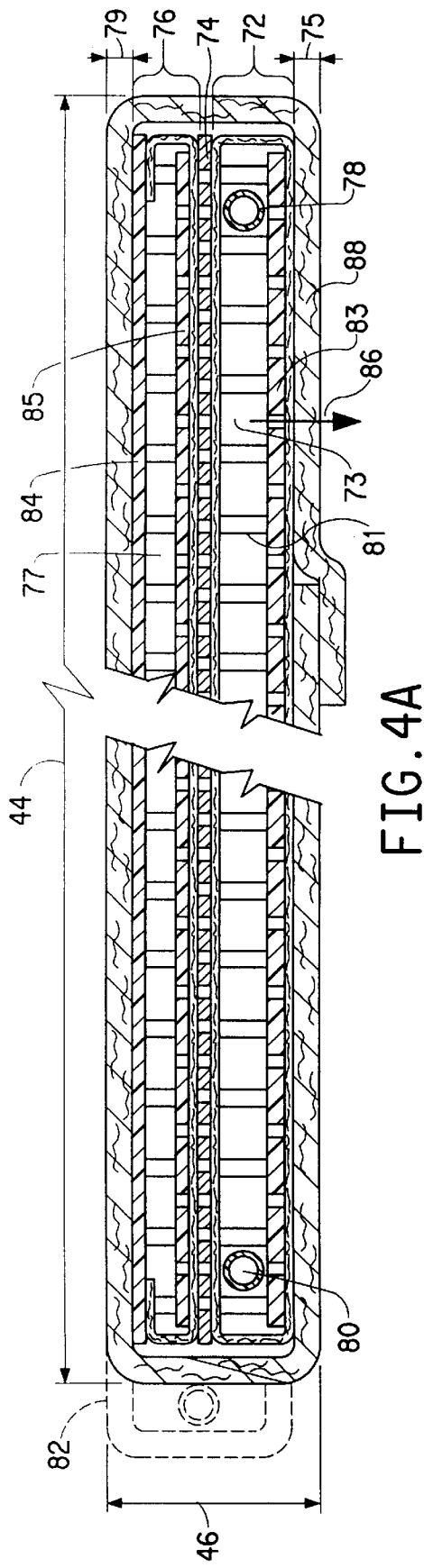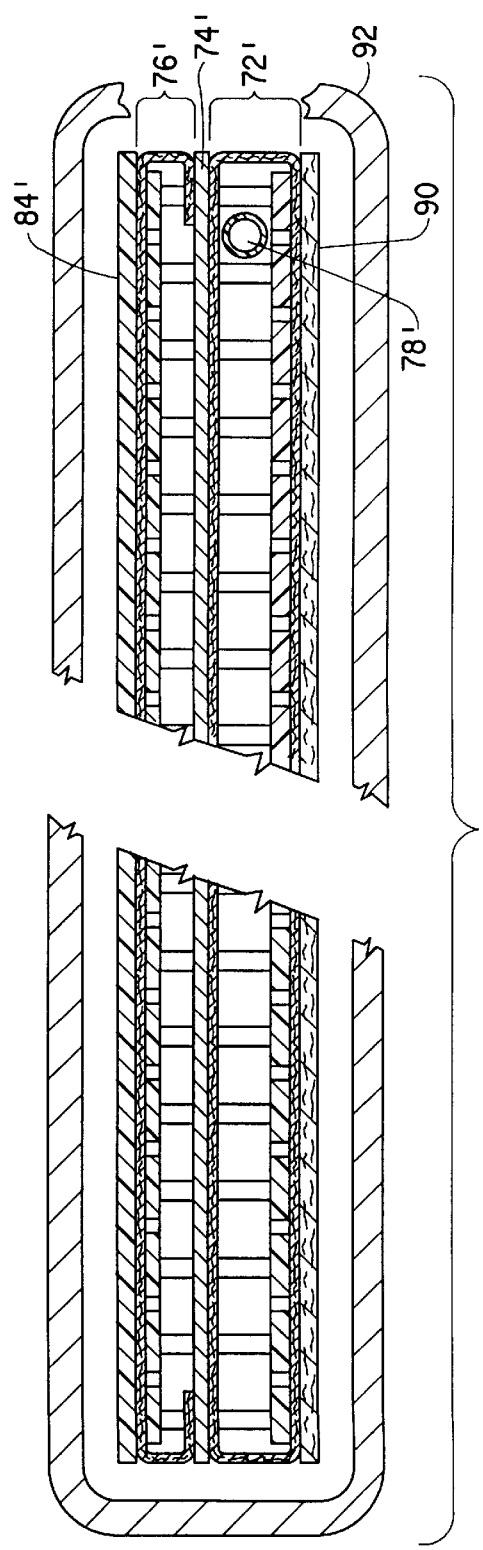

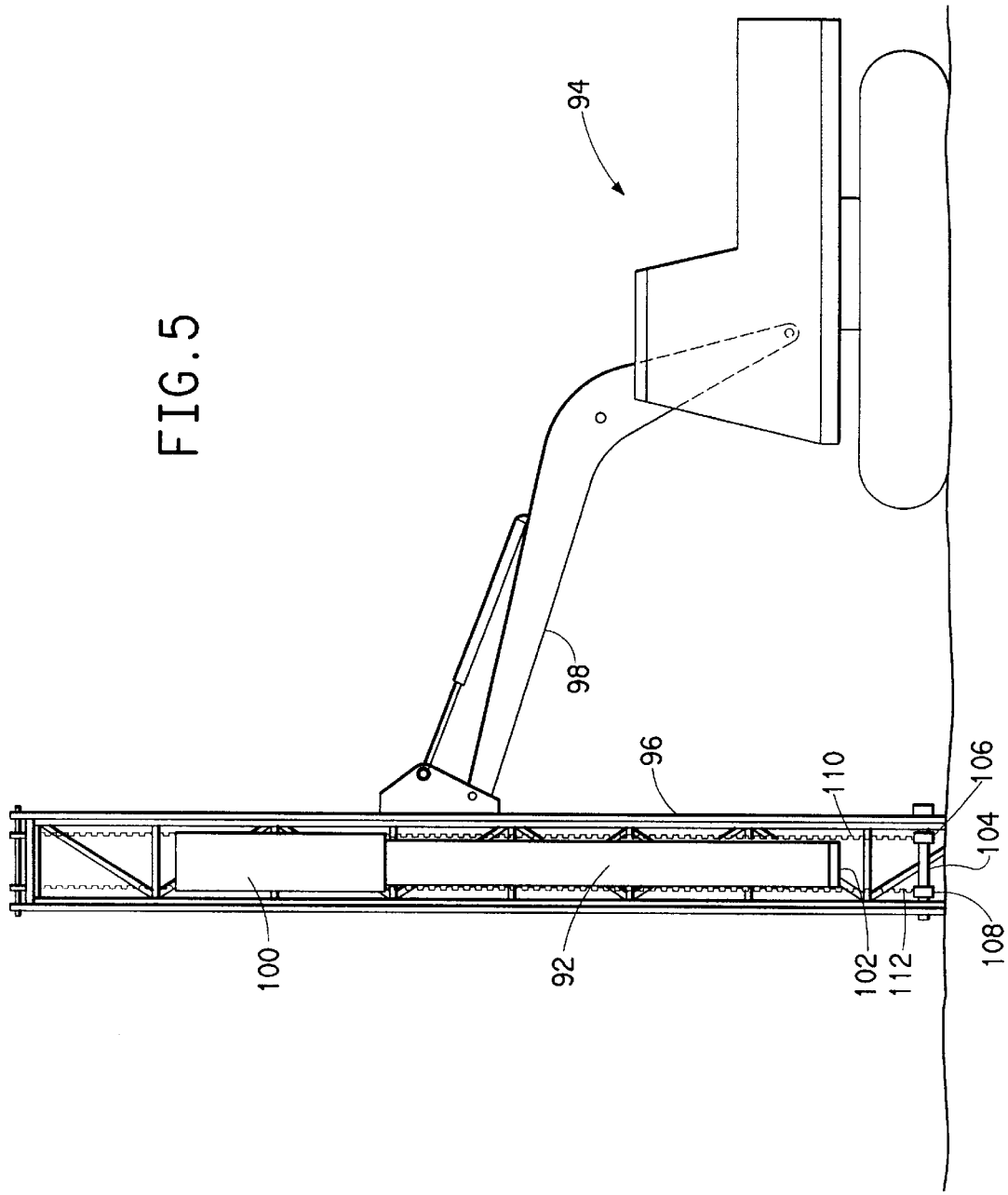

ELECTRIC FIELD METHOD AND APPARATUS FOR DECONTAMINATING SOIL

CROSS-REFERENCE TO RELATED APPLICATION

This application is a continuation-in-part of application Ser. No. 08/349,213, filed Dec. 5, 1994 now U.S. Pat. No. 5,584,980.

FIELD OF THE INVENTION

This invention relates generally to the removal of contaminants from hazardous waste sites and, more particularly, to the use of electroosmosis and electromigration techniques for such purpose.

TECHNICAL BACKGROUND

Many different techniques have been proposed over the years for removing contaminants from hazardous waste sites, such as contaminated soil, all of which have suffered from one or more disadvantages which have made their use either technically or economically impractical. As used herein, soil can generally be understood to mean an earthlike medium having porosities ranging from a very densely packed clay medium to a relatively loosely packed medium, such as loosely packed sand.

The excavation and subsequent treatment of contaminated soil, for example by soil washing or incineration, is a costly technique and may expose workers using such process to health risks. Moreover, in the case of soil washing, the procedure may not extract all of the contaminants attached to the clay or silt components of the soil, while in the case of incineration, a site pollution problem may be replaced by the creation of an air pollution problem.

In situ collection and injection remediation techniques have also been proposed. Collection techniques, such as the collection of a contaminant plume by pumping and/or drains, often suffer from dilution by surrounding ground water during collection, thus increasing the pumping and treatment costs. Further, effective control of the direction of the flow is generally not possible due to soil heterogeneity and cracks.

Injection techniques, such as by using chemicals or biological agents injected in situ into the soil to detoxify the wastes, suffer from the difficulty of achieving a uniform distribution of the detoxifying materials throughout the soil. Moreover, both collection and injection techniques based on the use of pressure driven liquid flows may be impossible to use in soils having low hydraulic permeability so that their use is generally limited to relatively high permeability soils, e.g., relatively sandy soils. Also, when using presently proposed in situ remediation methods, including high pressure soil flushing, vacuum or steam extraction, or radio frequency volatilization, many contaminant materials, particularly heavy metals, cannot be removed because of the strong attachment forces which bind the metals to the soil particles.

Electroosmosis has been proposed for the dewatering and consolidation of clays or other soils to provide soil stabilization, such as for construction purposes, and for the purposes of removing contaminants from soil by transporting the contaminants with the flowing water. As used herein, electroosmosis is defined as the process of moving a liquid through a porous material by the application of an electric field. In accordance therewith voltage gradients are established in the soil and the water therein is thereby caused to migrate toward and accumulate at or near one of the electrodes which are used to create the electric field therein, the accumulated water therein being removed therefrom, as by pumping.

Electromigration is a process that utilizes an electric field applied to the soil to transport contaminants by means of attracting ionically charged particles toward the electrodes with or without significant mass flow of fluid. Such a process is especially useful for removing metal contaminants from soil in-situ using electrodes to create an electric field. The contaminant ions may move in the same direction as the fluid flow or they may move in the opposite direction as the fluid flow in the electric field. A term that encompasses both the process of electroosmosis and electromigration is the term electrokinetics.

An electroosmosis system is described in U.S. Pat. No. 5,074,986 wherein at least one and, preferably, a plurality of porous anode electrode structures and at least one and, preferably, a plurality of porous cathode electrode structures are positioned at selected locations and at selected depths within a contaminated soil region. Such a system may also be applied to soil which has been removed from below ground and has been piled at a suitable location on the surface of the ground. The electrode structures are designed, for example, so that they are in the form of channel structures, such as tubular channels extending from the surface to below the contaminated region, the portions of the electrode structures below the surface within the contaminated region being porous, or perforated. One means of placing such tubular electrode structures in the soil would be to bore a hole in the soil and insert the electrode. In the case of a conventional well electrode, the hole would be bored, an electrode rod inserted and a porous fill, such as gravel or sand would be backfilled into the bored hole. Such boring, however, produces waste soil that must be separately decontaminated. Depending on the polarity of the charge of the soil, the electroosmotic flow can be either toward the anode electrode structures or the cathode electrode structures. In a positively charged soil, for example, electroosmotic flow will be toward the porous anode electrodes, whereas in a negatively charged soil the flow is toward the porous cathode electrodes. In the description below an electrode structure from which the flow emanates is called the "source electrode," and an electrode structure to which the flow migrates is called the "sink electrode."

A non-contaminating purging liquid, such as water, is supplied to the one or more source electrode structures so as to flow into the channel thereof and outwardly therefrom through the perforated portions thereof into the pores of the contaminated soil region. Voltage gradients are established between the source electrodes and sink electrodes by applying DC voltages thereto to create electric fields between source and sink electrodes. The contaminated liquid in the pores of the soil is displaced by, and accordingly, moved through the pores by, the non-contaminating purging liquid which purging liquid is itself moved through the pores as a result of electroosmosis. In some cases, depending on the nature of the contaminated liquid in the pores, and in particular with aqueous solutions, in addition to being moved by the purging liquid, such contaminated liquid may also be moved through the pores directly by electroosmosis.

The contaminant liquid moving through the pores flows into the one or more sink electrodes through the perforations therein and can then be removed to the surface through the sink electrode channel structures using suitable pumping or siphoning action, for example. The contaminant can thereupon be suitably collected at the surface.

By controlling the applied DC voltage levels, the number of electrode structures, and the depths and spacings of the electrode structures so as to control the directions and interaction of the voltage gradients produced between the electrode structures, the system can be operated in an effective manner, being particularly useful in waste sites having relatively low hydraulic permeabilities lying in a range of about $10^{-3}$ cm/sec. or less, comprising clays or the like.

There is a problem with the use of electrode wells or tubular electrodes that are distributed in a contaminated portion of soil in an equidistant array where the distance between like electrodes is about the same as, or sometimes slightly greater than, the distance between unlike electrodes. In this type of conventional array, it is believed that a highly non-uniform electrical field is produced because of unequal current paths between unlike electrodes. This is the so-called two-dimensional field effect versus the so-called one-dimensional field effect that has been observed in laboratory experiments with electroosmosis electrodes as reported in a paper entitled "Fundamental Aspects of Removing Hazardous Materials from Soils by Electric Fields". This paper was presented by Ronald F. Probstien at the July 1994 proceedings of the Electric Power Research Institute (EPRI) Workshop on In Situ Electrochemical Soil and Water Remediation. In the one-dimensional experiments, a small cylindrical soil sample having dilute aqueous phase organics is contained between two electrodes that form caps to the cylindrical container. In this arrangement a uniform field is produced in the soil between unlike electrodes. In this situation, after about 1.5 pore volumes of fluid is removed from the sink electrode, more than 90% of the contaminant is removed from the soil. One pore volume is the volume of liquid that can be contained in one volume of soil. In a companion two-dimensional experiment, the soil is contained in an open top rectangular box and tubular electrodes are placed near the ends of the box. In this arrangement, non-uniform convection velocities and removal rates are observed and more than 4.0 pore volumes of fluid are removed at the sink electrode before the same level of contaminant removal is achieved. The author concludes that " . . . the electroosmotic velocity distribution resulting from a particular electrode configuration determines the efficiency of the removal process, with high efficiency in the area between the electrodes, while the area outside the electrodes is not as effectively purged." In such a system using an equidistant row of electrodes, the soil must be treated for a time sufficient to remove the contaminant from the portion of soil having the longest current path. This results in great inefficiencies in electrical power consumed and in the extended time required to treat a volume of soil. It has been estimated that due to the non-uniformity of the electric field between tubular electrodes, the number of pore volumes of fluid forced through the soil sample to achieve a high decontamination level between 90–100% is about 2× to 4× that required where a uniform field is established. If the extended time to move more fluid is to be compensated for by a higher flow rate achieved by closer spacings of unlike electrodes and higher electrical currents at the same voltage, there is an economic problem that more electrodes are required and more electrical energy is required, and additionally there may also be a problem with heating of the soil at high currents that tends to boil off the water thereby creating nonconductive regions.

Another means of achieving an electrode in the ground is to dig a ditch in the ground to a suitable depth and then backfilling the ditch with electrically-conducting powder particles. Terminal electrode rods are then imbedded at suitable gaps in the powder particles to form an electrode wall in the ground. Opposing electrode walls are connected to an electrical voltage so that one of the walls acts as a cathode and one as an anode. The electroosmosis occurs between the opposite electrodes. In Japanese patent publication 5-336842 such a system is used to remove salts from soil. Such a system has a problem in that a large quantity of soil must be removed and then disposed of to provide a ditch, and the ditch depth may be limited before problems with collapse of the ditch walls during digging occurs. In cases where the soil is contaminated with a hazardous substance, handling the soil is a major concern.

Another means for cleaning contaminated ground water in soil is to pass the water through a permeable mixture of activated carbon and iron filings. The activated carbon acts to retard the contaminant while letting the water go through. The retained contaminant remains in contact with the iron filings for an extended residence time so chemical reaction with the iron filings can break down the contaminants into harmless or less hazardous substances. The permeable mixture is applied by digging a trench that extends below the water table in an aquifer in the path of a plume of the contaminant. The mixture would be backfilled into the trench. In British patent publication GB 2,255,087 A to Gilliam, such a system is used to clean halogenated organics, including chloroform, trichloroethane, solvents, pesticides, etc. from ground water. Such a system is only effective in a loosely packed soil medium that facilitates water flow by gravity induced pressure. Such a system has a problem in that a large quantity of soil must be removed and then disposed of to provide a ditch, and the ditch depth is limited to only a few feet before problems with collapse of the ditch walls during digging occurs. In cases where the soil is contaminated with a hazardous substance, handling the soil is a major concern. Further details of such a process are contained in U.S. Pat. No. 5,266,213 to the same inventor.

Another means to handle contaminants in soil is to emplace electrode materials and treatment materials in the soil and use electroosmosis to drive the contaminants through the treatment materials as described in U.S. Pat. Nos. 5,398,756 to Brodsky et al and 5,476,992 to Ho et al, which patents are hereby incorporated herein by reference. Such a system uses trenching or soil fracturing to place the materials in the soil which is time consuming and, in the case of trenching, requires separate disposal and treatment of a significant amount of excavated material.

SUMMARY OF THE INVENTION

The invention is a method of emplacing a planar electrode wall, a planar treatment wall, or a planar combination electrode/treatment wall which comprises progressively forming the wall from a plurality of sub-walls by emplacing the sub-walls in the soil while leaving the soil in-situ, further comprising the steps of forceably inserting a mandrel into the soil; placing a first sub-wall of flowable material within the mandrel; removing the mandrel and leaving the first sub-wall of material behind in the soil; forceably re-inserting the mandrel into the soil adjacent the first sub-wall and in a partially overlapping alignment with the first sub-wall; placing a second sub-wall of flowable material within the mandrel; removing the mandrel and leaving the second sub-wall of material behind in the soil, and; continuing the mandrel insertion and placing of sub-walls until the wall is complete.

In the case of an electrode wall or electrode/treatment wall, an additional step is placing a plurality of spaced electrical connecting means in the wall for connecting to a source of electrical potential.

The invention is also a method of decontaminating a soil using treatment walls and an electric field comprising the steps of forming a plurality of planar electrode/treatment walls in-situ in which there is at least one source electrode/ treatment wall spaced apart from at least one sink electrode/ treatment wall, with the contaminated region in between. The soil is decontaminated by establishing an electric field through the contaminated region, which includes passing a volume of fluid through the contaminated region and through the electrode/treatment walls. The invention may include a treatment wall between the electrode/treatment walls and may include withdrawing treated fluid from the sink electrode/treatment wall, and recirculating the treated fluid to the source electrode/treatment wall. The contaminant is treated in both types of treatment walls where it is decontaminated, or consolidated and removed for further treatment.

The invention is further a treatment composition in a slurry form that resists expulsion from the soil caused by rebound of the soil after a mandrel, used for emplacing the treatment sub-walls, is removed. In a preferred embodiment, the slurry composition comprises iron particles combined in a certain proportion with a clay water mix. The invention is also a particular electrode/treatment composition comprising a combination of a treatment composition and coke particles in particular proportions.

The invention is a mandrel for insertion in the soil for emplacing material in the soil, the mandrel having external first and second guide ribs and internal ribs for stiffening, a hopper for holding material, and a plurality of openings in the end inserted in the soil for providing lubrication fluid during mandrel insertion in the soil. One external rib leaves a path in the soil that serves to guide the other rib when the mandrel is re-inserted in an overlapping alignment with said first insertion.

BRIEF DESCRIPTION OF THE FIGURES

FIGS. 4A and 4B are section views of two embodiments of an elongated electrode panel.

FIG. 5 is an elevation view of a device for driving mandrels into the soil to install the elongated electrode panels.

DETAILED DESCRIPTION OF THE FIGURES

Figure 1:
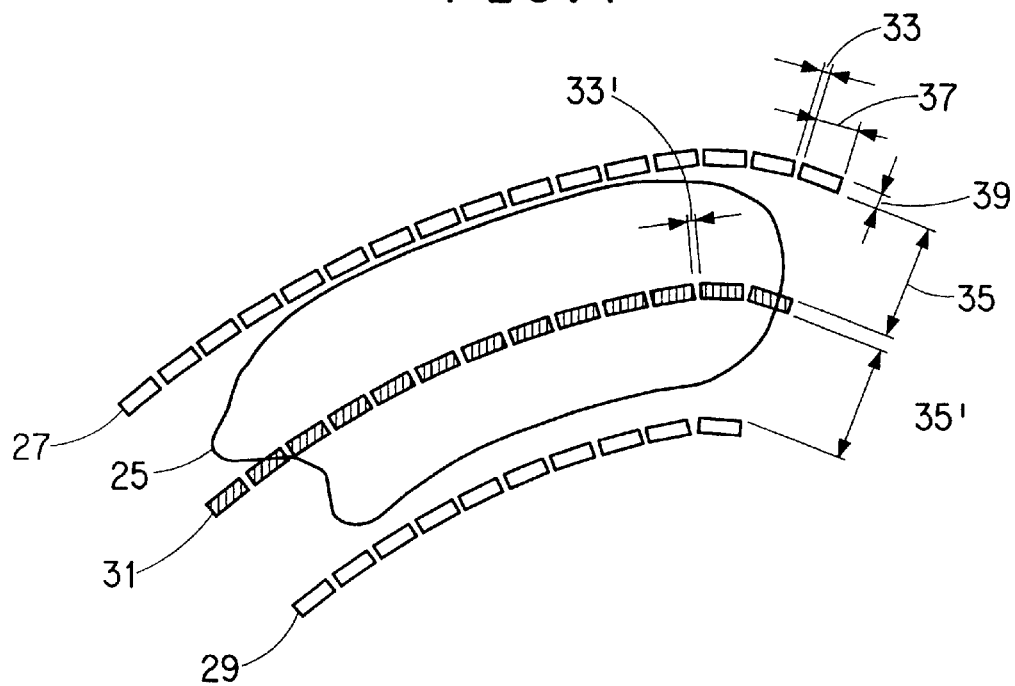
FIG. 1 is a schematic plan views of an arrangement of electrode assemblies for treating contaminated regions.

FIG. 1 shows a plan view of a contaminated soil region 25 with an arrangement of a plurality of electrode assemblies to create an electric field in the contaminated region. There are 2 rows of a first type electrode assembly, such as anode assemblies 27 and 29. These are spaced apart from one row of a second type electrode assembly, such as cathode assembly 31. The gap distance 33 between the like electrodes in row 27, and the same distance 33' between the like electrodes in row 31, is more closely spaced than the gap distance 35 between unlike electrodes in rows 27 and 31 (the distance 35' is essentially the same as distance 35). For a substantial improvement in uniformity of the electric field, the closely spaced gap distance 33 should be less than 50% of the gap distance 35. These electrodes are panel electrodes that have a width 37 greater than their thickness 39 so the gap distance 33 and 33' between like electrode assemblies is much smaller than the gap distances 35 and 35' between unlike electrode assemblies. This is believed to provide an electric field that is an improvement over conventional electric fields. This high ratio of width to thickness also makes the panel electrode assemblies easier to insert in the soil while leaving the soil in-situ, since the small area of this type cross-section displaces only a small amount of soil. The arrangement of rows may be straight-line or they may be curved-line as in FIG. 1 depending on the shape of the contaminated region and the desired economical arrangement of electrode assemblies.

To achieve the best uniformity in the electrical field, there are several considerations for the row grouping of one type and another type of electrode:
  the rows should be reasonably straight with no small radius curves, although large radius curves and short staggers between adjacent electrodes are workable;
  the rows should be reasonably parallel, that is, the straight lines or large radius curves should be everywhere reasonably equidistant;
  the electrodes in the third dimension extending down into the soil will define or approximate straight planar surfaces or curved planar surfaces that should also be reasonably parallel.

Figure 2A:
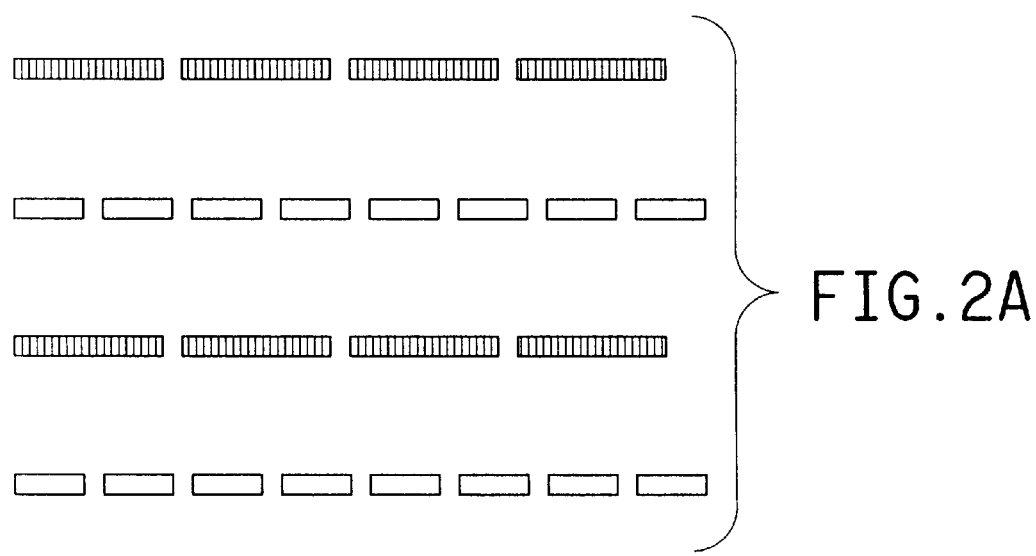
FIGS. 2A–2C are schematic plan views of electrode arrangements that illustrate different choices for rows of electrodes.
Figure 2B:
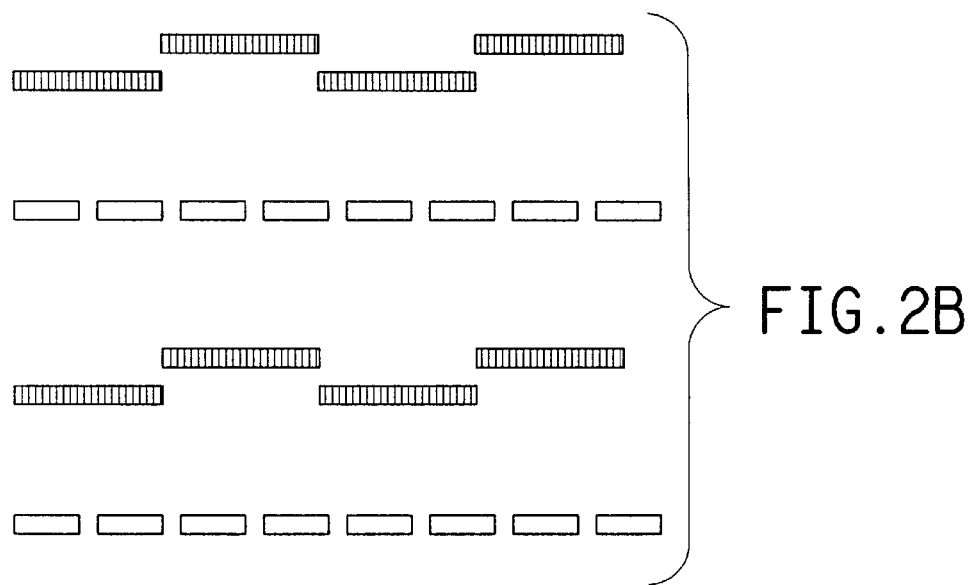
Figure 2C:
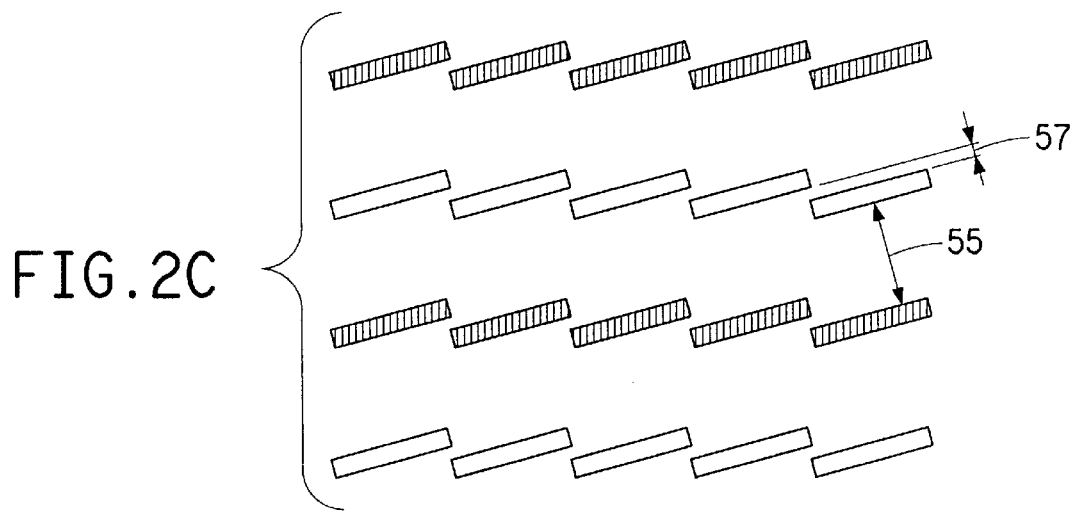

In FIG. 2A, an arrangement of a row of panel electrode assemblies is shown where the panels of one type of electrode are wider than the panels of the other type electrode, but the gaps between electrodes in the two rows are about the same. In FIG. 2B one row of panel electrodes may be staggered to effectively eliminate the electrical field gap between like electrodes in that row. In FIG. 2C, the panel electrodes may be "shingled" to effectively eliminate the electrical field gap. In this case, the unlike gap would be the shorter perpendicular distance 55 between unlike electrodes and the like gap would be the distance 57, the largest gap between like electrodes.

When determining the gap distance between like electrodes in a row, the distance is between adjacent electrodes in that row. When determining the gap distance between unlike electrodes in adjacent rows, the distance is from one electrode in one row to the closest unlike electrode in the adjacent row. In the electrical field, the critical distances are between actual electrode surfaces, not electrode assemblies that may include other components. However, when arranging electrodes in actual contaminated soil regions, the dimensions of the electrode assemblies are generally much smaller than the distances between electrode assemblies so that for most practical purposes, the relevant gap distances can be measured between electrode assemblies rather than the actual electrode surfaces. For unusually close spacings of electrode assemblies, however, the actual distance to an electrode surface may need to be used as the gap distance when evaluating electrode arrangements.

Figure 3A:
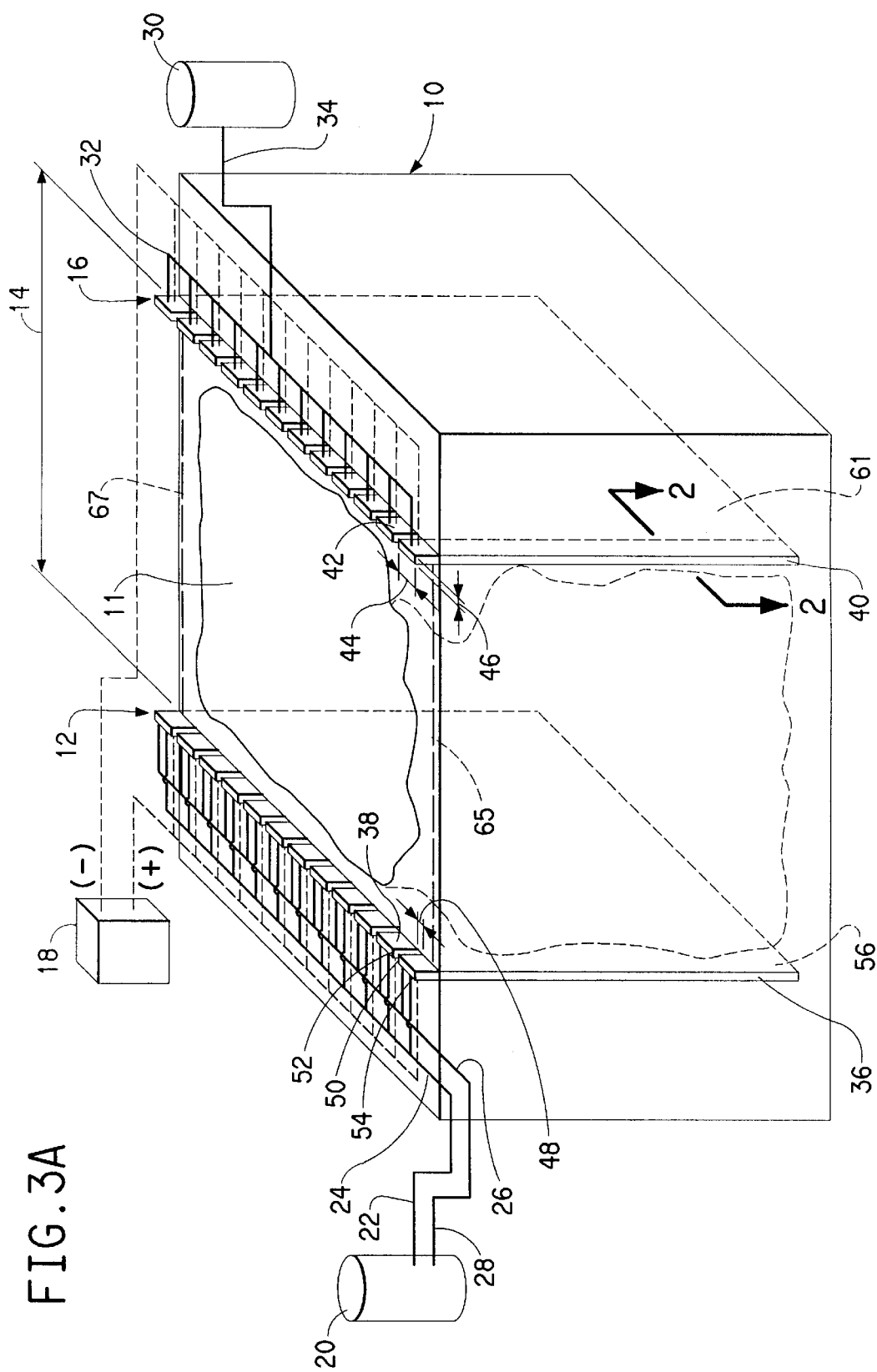
FIG. 3A is an isometric view of a section of a volume of soil showing rows of elongated anode and cathode panels.

FIG. 3A shows a cuboid volume of soil 10 with a contaminated volume 11. Adjacent the contaminated volume is a first row of electrode assemblies, such as source row 12 (that may be an anode row) that is uniformly spaced, such as by the substantially constant gap distance 14, from a second row of electrode assemblies, such as sink row 16 (that may be a cathode row). An electrical power supply 18 provides power to the rows of electrode assemblies. The electrical power supply 18 may be an AC to DC rectifier commonly used for cathodic protection systems with an output of 24 to 120 volts DC. Such a system may be obtained from Corrpro Companies, Inc. of West Chester, Pa. and Medina, Ohio. A purge fluid supply 20 provides a source of buffered solution to the row of sources 12 via a supply conduit 22 and supply manifold 24. A return manifold 26 and return conduit 28 provide a means to return fluid withdrawn from an electrode assembly to the supply 20. A pump may be part of the supply 20 to accomplish the fluid circulation. Returning a portion of the purge fluid accomplishes circulation of the fluid within the electrode panels and permits monitoring the composition of the fluid and treating the returned fluid with a fluid conditioning additive at the supply 20. Makeup water and buffering agents are added to supply 20 periodically as required to maintain a conditioned purge fluid available at the source row. An effluent reservoir 30 provides a container to collect effluent siphoned off the row of sinks 16 through manifold 32 and conduit 34. The effluent contains the contaminated water and purge fluid forced through the soil by electroosmotic forces, and the contaminant in the soil carried by the fluids. Periodically, the effluent would be removed and the contaminant neutralized or otherwise destroyed. In some cases, there may be a separate supply tank, a supply conduit, and supply manifold if it is desired to add fluid conditioner to the sink fluid. There may also be a return conduit to this supply tank if it is desired to condition the effluent during operation and before the effluent is removed for disposal.

Figure 3B:
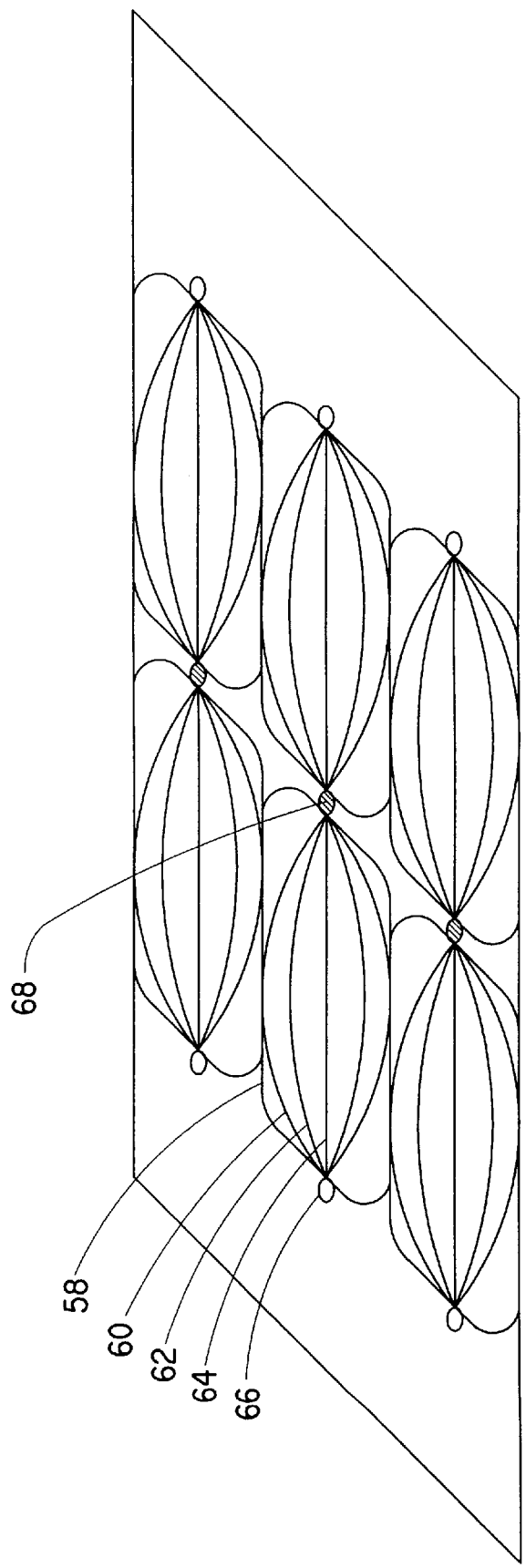
FIG. 3B is an isometric view of the top surface of the volume of soil of FIG. 3A showing a prior art arrangement of tubular electrodes and the resulting non-uniform electric field.

The electrode rows are each made up of a plurality of electrode panels, such as anode panels 36 and 38 and cathode panels 40 and 42. These are both as long as the contaminated volume is deep which may typically be 15–20 feet to as much as 75–100 feet. They have a width 44 that is much greater than their thickness 46. The ratio of width to thickness is typically greater than 2× and preferably greater than 5×. They are closely spaced end-to-end at a distance 48 so that typically end 50 of panel 36 is spaced from end 52 of panel 38 at a distance less than 100% and preferably less than 25% of the width of panel 36 from end 50 to end 54. In this way, row 12 defines a planar surface 56 and row 16 defines a planar surface 61 that is at least 50% electrode panel and 50% space between panels and is preferably at least 75% electrode panel and less than 25% space between panels. This produces a uniform electric field between electrode row 12 and 16. By uniform electric field is meant a field that has all electric paths about the same and has a contaminant removal efficiency that has substantially better performance than the so-called two dimensional results discussed in the background above and approaches the so-called one dimensional results. It is believed that with the presence of such a uniform field only about 1.5 pore volumes of fluid needs to pass through the contaminated soil volume to remove about 90–100% of most aqueous phase organic contaminants. For comparison, FIG. 3B shows one conventional arrangement of tubular electrodes that could be used to treat the same contaminated volume of soil. A representation of a plan view of the nonuniform electric field is shown by the group of curved lines, such as 58, 60, 62, and 64 between tubular electrodes 66 and 68. These lines represent current paths of several different lengths versus paths all of the same length. This will require more than 4 pore volumes of fluid to decontaminate the volume. Note that for best efficiency for the conventional arrangement, another row of electrodes is added to the contaminated volume.

Referring to FIG. 3A, at each end of the electrode rows, there is a row of a plurality of elongated, impermeable, geomembrane panels, such as rows 65 and 67. Geomembrane row 65 extends from one end of electrode row 12 to the corresponding end of the opposed electrode row 16. Geomembrane row 67 extends between rows 12 and 16 at the other end of the rows. The purpose of the geomembrane rows is to provide an electrical insulating barrier to electric currents straying out from between the opposed electrode rows. The geomembrane panels are typically 1/16" thick HDPE elongated sheets inserted in the soil using the mandrel system.

FIGS. 4A and 4B are typical section views of an electrode panel, such as section 2—2 of panel 40 from FIG. 3A. The elongated panel assembly has a width 44 and a thickness 46 that has a width to thickness ratio exceeding 2× and may typically be about 10× as shown in FIG. 4A.

In FIG. 4A, the panel has an elongated electrode material layer 74 having a width extending substantially across the width 44 of the panel. The panel assembly has one exposed end extending out of the soil and the other buried end opposite the one end which extends to the lower reaches of the contaminated region of the soil. There is a channel layer 72 having an elongated perforated core 83 containing an elongated fluid circulation channel 73 adjacent one side of the electrode layer for circulating fluids from the one end to the other opposite end of the panel assembly. The channel contains a plurality of standoffs, such as standoff 81, for resisting collapse by soil pressure forces. There is a permeable layer 75 for passing fluid to and from the channel 73 while retarding the flow of soil into the channel. The permeable layer may be adhesively attached to the channel layer or it may be part of a permeable covering 88 snuggly enclosing all sides and the buried end of the elongated panel assembly that acts to hold at least the channel layer and permeable layer together as a laminate structure, and in fact may hold all the layers together. The assembly may also include a conduit 78 disposed at the one exposed end and along a portion of the length of the elongated panel assembly for directing fluid to or from the panel assembly. The conduit 78 may typically extend to the top of the contaminated region when the panel is in the soil. The assembly may also include a second conduit 80 disposed at the one exposed end and along the entire length of the elongated panel assembly for directing fluid from the one exposed end to the opposite buried end of the panel assembly. This conduit 80 may be used to direct fluids to the bottom end of the assembly, which fluids can then be circulated upwards through channel 73 until they reach the top of the contaminated region and be withdrawn from the exposed end of the assembly through conduit 78. The conduit 80 may have orifices (not shown) along its length to supply fluid to the panel intermediate the upper and lower ends. In a simple electroosmosis application using short panels, the anode and cathode panels may not need any conduits within the assembly, since the fluid can be supplied and withdrawn from the top of the assembly.

In some cases the electrode assembly is used in a bidirectional arrangement where both sides of the electrode are active, i.e., facing unlike electrodes, such as the electrode row 31 in FIG. 1. The bidirectional assembly may include a second channel layer 76 having an elongated perforated core 85 containing a second elongated fluid circulation channel 77 adjacent another side of the electrode layer 74 for circulating fluids from the one end to the opposite end of the panel assembly on the other active side of the electrode. In this case, the electrode 74 may beneficially be a perforated electrode so fluid directed into channel 73 may also circulate to channel 77 through the electrode. A second permeable layer 79, similar to layer 75, is adjacent layer 76 for passing fluid to and from the second channel 77 while retarding the flow of soil into the second channel.

In some cases the electrode assembly is used in a unidirectional arrangement with only one active side, such as the electrode row 27 in FIG. 1, and the assembly may include an impermeable geomembrane layer 84 adjacent one side of the electrode material layer to thereby limit electrical current flow in that direction. In this case, the layer 76 may not be needed. The current and fluid flow would be directed as depicted by arrow 86.

Difficulties can be encountered during operation of the electrodes due to the generation of hydrogen ions at the anode and hydroxide ions at the cathode. Unless neutralized, the hydrogen ions generated at the anode will migrate into the soil, toward the cathode. The resulting low pH of the soil in the vicinity of the anode lowers the electroosmotic permeability of the soil, meaning that a higher applied electrical potential is required to induce the desired rate of water flow. This consumes more electrical power. Meanwhile, unless the hydroxide ions generated at the cathode are neutralized, they will migrate into the soil, toward the anode. The resulting high pH of the soil in the vicinity of the cathode can cause many contaminant species, such as heavy metals, to precipitate, thereby impeding their removal from the soil. Additional problems may arise when a contaminant's state of electrical charge changes with pH such that it will be in one state in the low-pH soil near the anode and another state in the high-pH soil near the cathode. Since the charge state determines which direction a species will migrate due to an electric field, an effective means of remediating soil by electroosmosis or electromigration may not be possible if the contaminant is not in the same charge state throughout the soil.

The present invention addresses problems related to soil pH by providing a means of controlling the pH of the fluid surrounding the electrodes, if desired, thereby preventing acidic or basic fronts moving through the soil. This can be accomplished by positioning the electrode material within the assembly so there is always a channel between the electrode and the soil. By passing a buffered solution within this channel, the hydrogen ion produced at the anode or the hydroxide ion produced at the cathode will be neutralized without having migrated into the soil. It has been found that the ion production rate is higher than the electroosmotic flow rate so good circulation of fluid in the channel is required to keep the fluid between the electrode material and the soil neutralized. By utilizing conduits 78 and 80, good circulation of fluid along the length of the assembly can be achieved. For instance, the flow rate of fluid from the source electrode assembly through the return and supply conduits may be 20x to 80x greater than the electroosmotic flow also going through the supply conduit. The supply tank 20 would have a fluid conditioning additive in the tank, such as lime, that dissolves slowly over time to keep the pH initially above neutral. As the pH level approaches neutral, more lime would be added to the tank. A stirrer in the bottom of the tank would keep the lime suspended and the solution in the tank at a uniform pH. It is desirable to circulate the fluid at such a rate that the pH level in the return conduit 28 does not differ from the pH level in the supply conduit 22 by more than about 0.1 to 0.2 pH units due to the electrochemical reaction in the electrode assembly. Without such circulation in the electrode assembly there may be significant pH variations along the length of the electrode that would decrease the efficiency of the electroosomosis process by decreasing the electroosmotic flow rate at the voltage used.

The conduits 78 and 80 are shown disposed within the channel layer 72 which is thick enough to allow for a large diameter for the conduits. Alternatively, layer 72 could be thinner and the same size conduits located at the ends of the panel, such as shown in dashed lines at 82, where the overall panel thickness is also shown thinner. This would result in a slight increase in the panel width 44 without an increase in the width of the electrode 74, but the effect of such a change in the operation of the electrode assembly is considered minor.

The purge fluid can be buffered by adding a base material such as NaOH or lime. NaOH produces the least reduction in flow rate compared to lime, but it also was found to produce about 20% soil swelling adjacent the anode which is perceived as a problem. A mixture of 10% or 20% NaOH and 90% or 80% lime by volume produces a buffer additive that keeps the flow rate substantially constant and does not produce noticeable soil swelling. The conduits and fluid circulation channel in the assembly can also be usefully employed to introduce other fluid conditioning additives besides buffers to the assembly. These may include complexing agents, surfactants, pH modifiers and the like.

FIG. 4B shows an alternative embodiment for the electrode panel where the electrode 74' is a solid metal sheet to which the layers 76' and 72' can be easily attached with adhesive. If additional filtering is required for the particular soil involved or additional strength to resist soil pressure is desired, a piece of geotextile 90 may be adhesively attached to layer 72'. If a current insulator is required, geomembrane 84' can be adhesively attached to layer 76' which can also act to block infiltration of soil through layer 76'. If the panel is to be used as a sink electrode, only one conduit 78' may be required. Item 92 is a mandrel (to be discussed later) that is temporarily used to insert the panel in the soil, so the panel must fit loosely in the mandrel as shown.

The panels can be inserted into the soil while leaving the soil in-situ, that is, without excavating soil, by forcing a hollow mandrel into the soil, placing the panel in the mandrel, and removing the mandrel while leaving the panel behind. The soil may then collapse back around the panel. The only soil removed is that which may stick to the mandrel upon removal and this can be minimized by scraping the mandrel at the soil surface as the mandrel is withdrawn. FIG. 5 shows an elevation view of an excavator 94 that has a three-sided mast 96 attached to its boom 98. This view is looking into the open side of the mast where there is suspended a vibratory hammer 100. Below the hammer and gripped by it is a mandrel 92 which has a shoe 102 on its lower end. There are rails (not shown) on the mast for guiding the mandrel. A motor driven shaft 104 with sprockets 106 and 108 drive chain loops 110 and 112, respectively, that raise and lower the hammer 100 and attached mandrel 92. In operation, the mast is located where it is desired to place the next electrode panel and the mast is pressed against the soil by the excavator and tilted until it is vertical within about 1 degree. An excavator useful for this purpose is a model 235C made by the Caterpillar Co. of Peoria, Ohio. The mandrel is secured to the raised hammer using clamps furnished with the hammer. A hammer useful for this purpose is a model 150 furnished by American Piledriving Equipment Inc., of Kent, Wash. A shoe is held in place on the mandrel as it is lowered to the surface of the soil. The shoe is preferably a pair of angled plates with a 60 degree included angle with a cross brace at each end to engage the end of the mandrel and resist spreading of the plates. The mandrel has pointed ends that match the 60 degree angle of the shoe and that fit outside the braces. The driven shaft 104 rotates to drive the chain loops to lower the hammer and mandrel and force them into the soil. The vibratory hammer is energized to drive the mandrel and shoe through the soil until the proper depth is reached which depends on the depth of the contamination in the soil. The hammer is then released from the mandrel and raised by the driven shaft and chain loops. The electrode panel is then placed in the open end of the mandrel by hand or the hammer can grip the panel and be used to lower it into the mandrel. Alternatively, the panel may be inserted into the mandrel before it is driven into the soil. After the panel is in the mandrel, the hammer is lowered and reengages the mandrel and the hammer may be momentarily energized to free the mandrel. The driven shaft and chain loops then pull the mandrel from the soil leaving the panel in place. Soil scraped off the mandrel as it is withdrawn may fall back into the space left between the mandrel and the panel in the soil.

Figure 6:
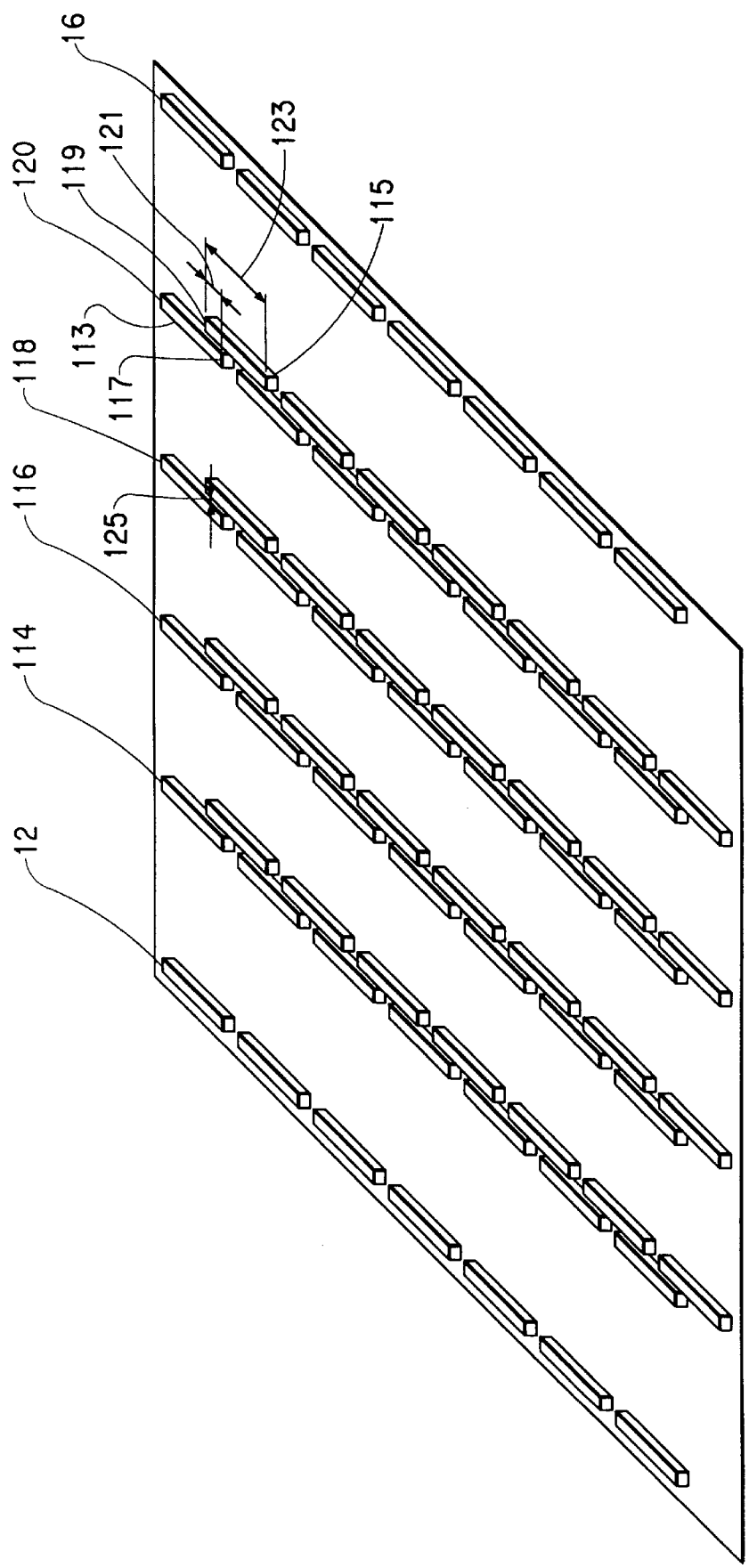
FIG. 6 is an isometric view of rows of electrode panels and treatment panels.

FIG. 6 shows another way to handle the contaminants in the soil by special treatment as the fluid flows from the source 12 to the sink 16 electrode rows of FIG. 3A. Only the electrode rows 12 and 16, and treatment rows 114, 116, 118, and 120 are shown to illustrate this embodiment. The treatment rows comprise a plurality of treatment panels that are arranged to be overlapped and staggered in a way that forces all the fluid to travel through the treatment panels rather than the tortuous path around them as the fluid flows from electrode row 12 to electrode row 16. This is accomplished by placing a first treatment panel, such as panel 113 adjacent a second treatment panel, such as panel 115 with one end 117 of the first panel overlapping and staggered relative to the adjacent end 119 of the second treatment panel, with the overlap distance 121 being less than 25% of the width 123 between ends of a panel and the ratio of the overlap 121 to the stagger gap 125 being greater than 0.3.

Within the panels would be a treatment media such as a flowable solid that can be added to the panel after it is inserted in the soil. The treatment media will ordinarily remain within the panel during the treatment process. For treating halogenated organics, the media may be iron filings, or iron filings that are mixed with activated carbon as taught in the above referenced '087 British publication. For other contaminants, the media may be a mixture of sand, activated carbon and nutrients that support microorganisms that digest the contaminants. Other forms of biological treatment may also be possible. The treatments may be accelerated by the introduction of oxygen, air, other gases or other fluids so conduits may be provided in the panels similar to the conduits discussed in reference to the electrode panels. The treatment panels can be inserted in the soil the same as the electrode panels. Preferably, the treatment media would be added to the panel before the mandrel is withdrawn to eliminate soil pressure deformation of the panel that may inhibit free flow of the media and decrease the quantity of media that can be added.

Figure 7:
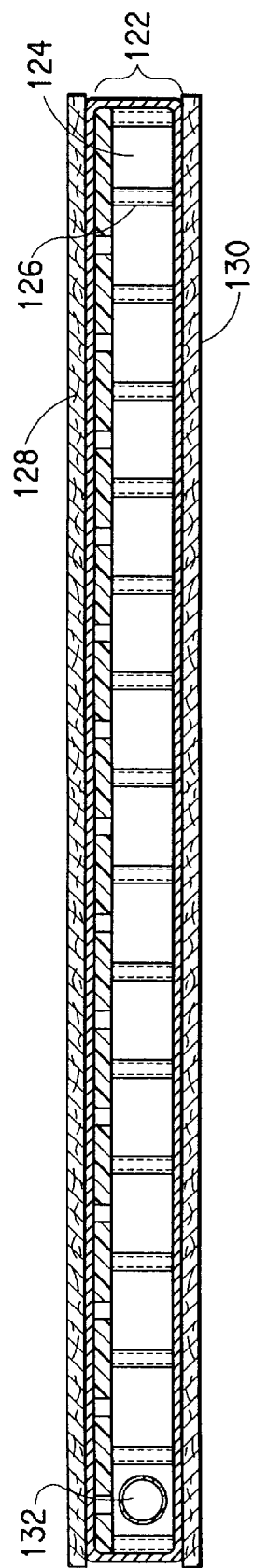
FIG. 7 is a section view of an embodiment of an elongated treatment panel.

In FIG. 7, the treatment panel consists of a channel layer 122 that contains a perforated elongated channel 124, for holding a flowable treatment media; a first geotextile filter layer 128 and a second geotextile filter layer 130 that keeps soil particles from plugging the treatment media and retards flowing of the flowable treatment media out of the channel. The channel contains a plurality of standoffs, such as standoff 126, for resisting collapse by soil pressure forces. Conduit 132 is disposed along the length of the elongated treatment panel to direct fluids from one end of the panel to the other to add fluids to the treatment media as required; it may have orifices along its length. The treatment panel assembly has a width to thickness ratio greater than 2×.

Figure 8:
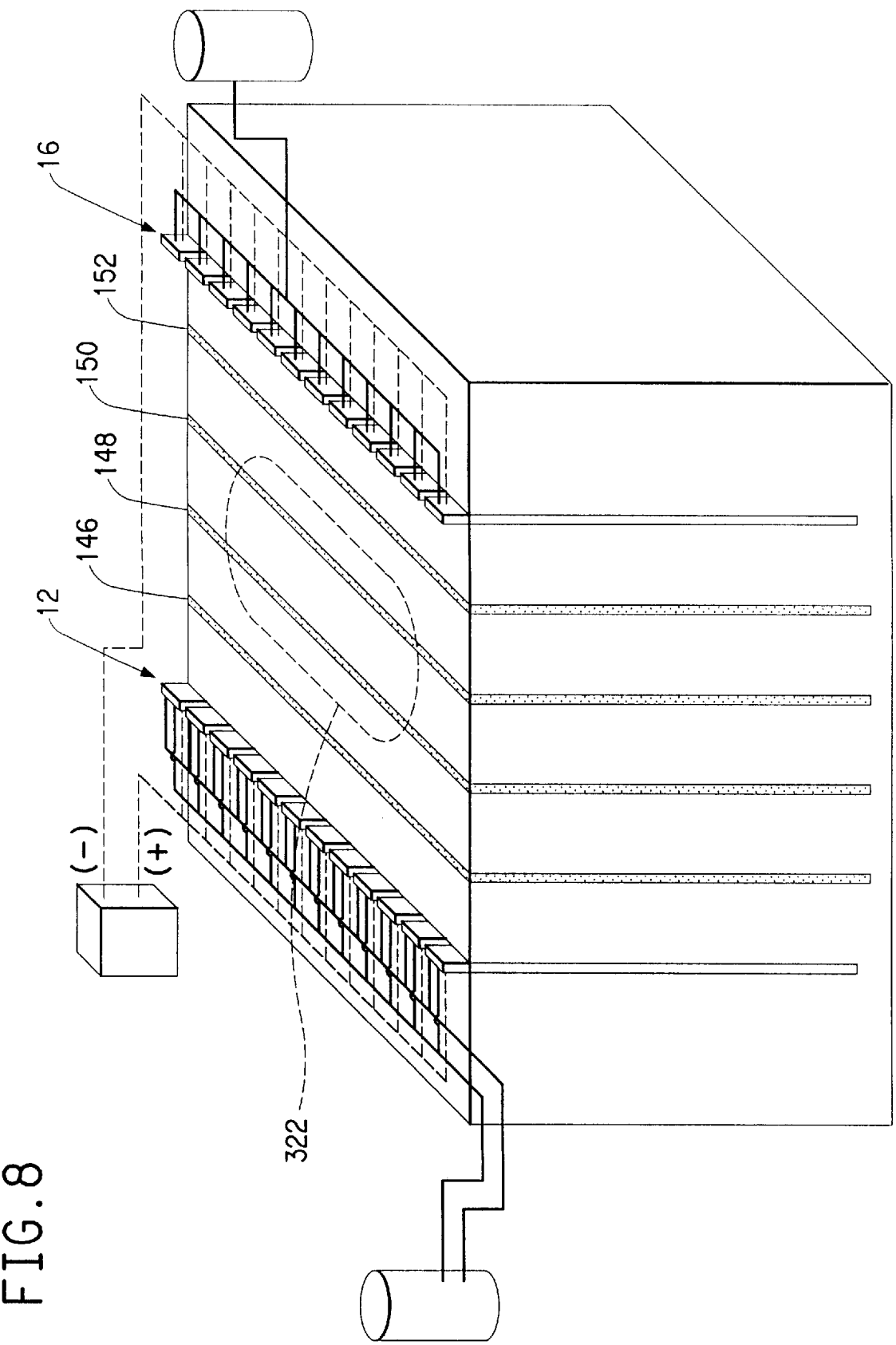
FIG. 8 is an isometric view of a section of a volume of soil showing rows of electrode panels and treatment walls.

FIG. 8 shows another embodiment for treating the fluid between the electrode rows. In this case, treatment panels are not used and instead, treatment walls 146, 148, 150 and 152 of a flowable treatment medium are constructed between electrode rows 12 and 16. These can be constructed by using a pair of mandrels that are alternately inserted adjacent to and abutted with one another. The mandrels may have mating ribs and slots so the mandrels are linked together as are conventional dam walls that are sometimes used to positively retain soil or fluids in a volume of soil. A treatment wall can be progressively formed in the soil while leaving the soil in-situ by forming successive sub-walls of a treatment wall by forcing a first mandrel into the soil; placing a second mandrel into the soil and with a first end abutted with the first mandrel; placing the flowable treatment medium into the first mandrel; removing the first mandrel and leaving the flowable medium in place to form a first sub-wall of a treatment wall; placing the first mandrel into the soil and abutting the first mandrel with a second end of the second mandrel; placing the flowable treatment medium in the second mandrel; removing the second mandrel to form a second sub-wall of a treatment wall; and; repeating the steps with the mandrel until the entire assembly of the planar treatment wall extends for the length of the electrode rows. Such a technique may also be used to form an electrode wall as an alternative to using electrode panels, or trenching as taught in the above-referenced '842 Japanese patent application.

When treatment panels or treatment walls are used between the electrode assemblies, the effluent withdrawn from the sink electrode assemblies may be relatively free of contaminant as a result of the treatment. It is feasible to take the effluent fluid from the sink electrode assemblies, provide some simple treatment if necessary, and use it as the supply fluid for the source electrode assembly. This would conserve fluid and would eliminate a possible problem in disposing of a large quantity of effluent fluid. Alternatively or additionally, when using treatment panels or walls, it may be desirable to alternate the source and sink electrodes by periodically reversing the polarity of the electrical power applied to the electrode assemblies. This would reverse the electroosmotic flow through the treatment panels and the sink fluid would become the source fluid and vice-versa. In this case, the electrode materials in the two types of electrode assemblies would have to function equally well as anodes or cathodes. The ¼" thick electrode plate in the embodiment of FIG. 4B would work well for both electrodes in this case.

Although the invention has been discussed in the context of inserting various panels vertically into soil in-situ, it is within the scope of the invention to use the panels horizontally or at some other angle. The soil may also be excavated and piled up and the panels inserted in the pile. For instance, one row of sink electrode assemblies may be placed on a horizontal surface, the soil may be piled on top of the assemblies to the desired treatment depth, and a second row of source electrode assemblies placed on top of the soil pile with a capping layer of soil placed on top of the second assemblies. Impermeable walls may be placed around the pile. Fluid would be added to the source assemblies and pass through the soil by electroosmosis aided by gravity and be withdrawn at the sink assemblies.

Figures 9A, 9B:
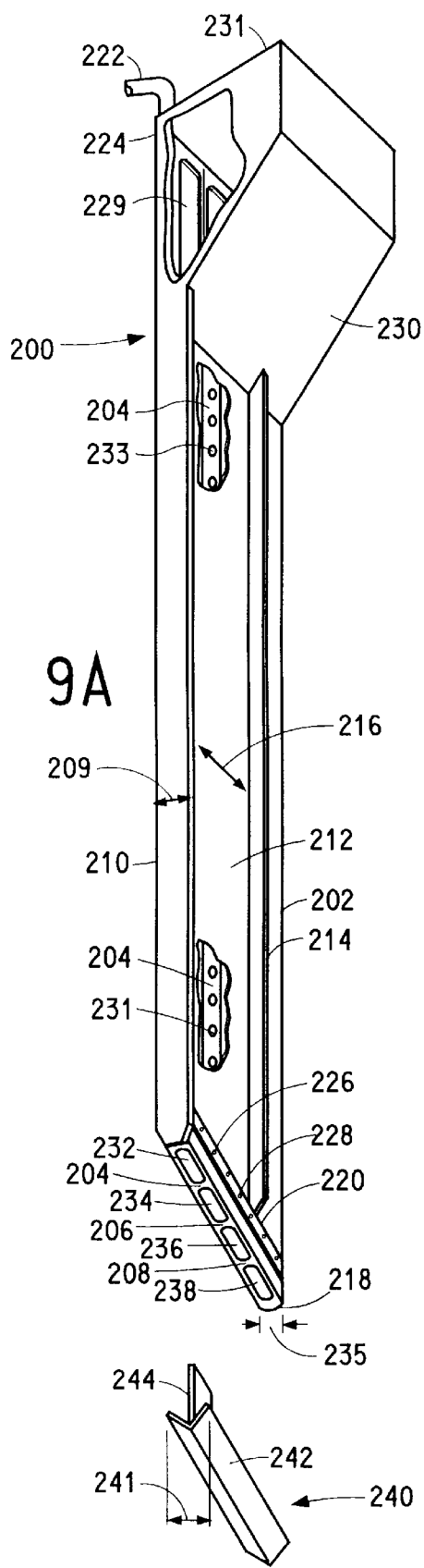
FIG. 9A is a perspective view of a mandrel for forming planar walls of material.
FIG. 9B is a shoe for the mandrel of FIG. 9A.

The mandrel procedure using two mandrels is sometimes difficult and slow to implement, however. It has been found that the planar treatment wall can be emplaced by using only a single mandrel to place a first sub-wall of a treatment wall and then reinserting the mandrel in a partially overlapping alignment with the first sub-wall of the treatment wall to form a second sub-wall to form a continuous treatment wall. Surprisingly, the reinsertion of the mandrel can be controlled accurately enough to maintain alignment with the first sub-wall, and continuity of the wall can be maintained with only a small amount of overlap so little duplication of treatment material is required. FIG. 9A shows an perspective view of a mandrel design that is useful in the single-mandrel emplacement technique. FIG. 9B shows a disposable shoe that is used on the leading end of the mandrel to help the mandrel penetrate the soil as it is driven into the soil.

Mandrel 200 comprises an elongated rectangular tube 202 with separating and reinforcing ribs 204, 206, and 208 that extend the length of tube 202. The ribs resist deformation forces on the entrance end of the mandrel as it penetrates the soil, and stiffen the tube so the mandrel 200 remains straight with little bending in the direction of arrow 209 as it is driven into the soil. Attached to one short edge of the tube 202 is a guide rib 210 that extends beyond both long sides of tube 202, such as side 212. Attached inboard of the opposite edge of tube 202 and extending from both sides of tube 202 is guide rib 214. Guide rib 214 is parallel to guide rib 210 and has one portion attached to long side 212 and its mirror image portion on the opposite long side (not shown) of tube 202 in a corresponding position. The guide ribs 210 and 214 serve to further stiffen tube 202 in direction 209, and they serve to resist movement of the mandrel 200 laterally in the soil in the direction of arrow 216 as the mandrel is driven into the soil. The hole left in the soil by the guide ribs can also be used to assist in aligning the mandrel for reinsertion in the soil as will be discussed later.

At the end 218 of the mandrel that is driven into the soil, there is a bar 220 that is in fluid communication with a conduit 222 at the opposite end 224 of the mandrel. Between conduit 222 and bar 220 is an additional rigid or flexible conduit. In a preferred embodiment, a rigid pipe is connected to conduit 222 and through or outside of tube 202 to bar 220. A flexible hose could also be used inside tube 202. The flexible hose is believed to be insensitive to vibration encountered during mandrel insertion into the soil. The bar has a plurality of holes, such as holes 226 and 228 that are in fluid communication with one another, by means of a channel not shown, and with conduit 222. During insertion of the mandrel 200, fluid pressure is applied to conduit 222 to cause fluid to exit holes, such as holes 226 and 228, to lubricate the soil/mandrel interface. At the end 224 that remains out of the soil, there is a hopper 230 that can be filled with material for forming a treatment wall, an electrode wall, or an electrode/treatment wall as will be discussed. The hopper 230 is open on the top side 231 and the interior of the hopper is in fluid communication with the interior of tube 202 as represented by the passages 232, 234, 236, and 238 separated by ribs 204, 206, and 208. For instance, the flowable material in the hopper may enter channel 232 through opening 229.

There are a plurality of holes in each rib 204, 206, and 208 to provide fluid communication between the passages on each side of a given rib. A plurality of these holes are present at both ends of the tube 202 (such as the top and bottom 4 feet of tube) as shown in FIG. 9A in the cutout views. Holes such as hole 231 in rib 204 near tube end 218 connect passage 232 with passage 234. Near tube end 224, holes, such as hole 233 in rib 204 connect passage 232 with passage 234. If the flowable material in the hopper happened to bridge over opening 229 to passage 232, the material could still enter passage 232 from passage 234 through holes, such as hole 233. When the mandrel is being driven into the soil and if passage 232 at end 218 becomes clogged with a short plug of soil, the flowable material in passage 232 could get out of the mandrel and into the soil by flowing through holes in rib 204, such as hole 231, and could flow out through passage 234. In this way, the measured amount of material in the hopper can get through the mandrel and distributed at the end of the mandrel regardless of occasional temporary bridging or clogging.

FIG. 9B shows a shoe 240 comprised of an angled bar 242 and a tab 244 that is arranged to fit within passage 232 of mandrel 200. The shoe covers the passages 232, 234, 236, and 238 of tube 202 to keep most soil out of the passages, and it directs the soil to either side of the tube 202 as the mandrel 200 is driven into the ground. The width of the shoe at 241 is slightly wider than the distance across the short end of mandrel tube 202 so the shoe may relieve some of the soil pressure on the mandrel during insertion, and the shoe will be caught and held by the soil when the mandrel is withdrawn. The shoe width 241 is less than the width of the guide ribs 210 and 214 so it does not interfere with their imprint in the soil as will be discussed. The end 218 of mandrel 200 is shaped at an angle to fit within the angled bar. The shoe can be easily separated from the mandrel so after the mandrel has been driven into the soil, the shoe can be left behind as the mandrel is withdrawn, thereby uncovering the passages in tube 202 so material for the treatment wall, electrode wall or electrode/treatment wall can flow from the passages and remain in the space left by the withdrawing mandrel in the soil.

The rectangular mandrel described above has a small short end dimension 235 that results in a very thin wall of material being placed in the soil, which is difficult to achieve for deep walls greater than 10 feet deep. This allows much thinner walls of treatment, electrode, and electrode/treatment material to be used than is possible using the commonly practiced emplacement method of trenching. According to the '394 Blowes reference, in a deep trench made using a back-hoe, the bucket of a machine capable of digging down 30 meters typically is 1 meter wide, resulting in a 1 meter wide trench. A large volume of emplaced material must be prepared and handled to fill such a trench. Using the mandrel method of the instant invention, the mandrel may be only 2–6 inches in end dimension, so a much smaller volume of emplaced material need be prepared and handled. In some cases with electrode and treatment material there may be a distinct functional advantage of having the functionally required material concentrated in a small volume; such an advantage cannot be economically achieved with conventional emplacement techniques that distribute the functionally required amount of material in a much larger volume.

Figure 10:
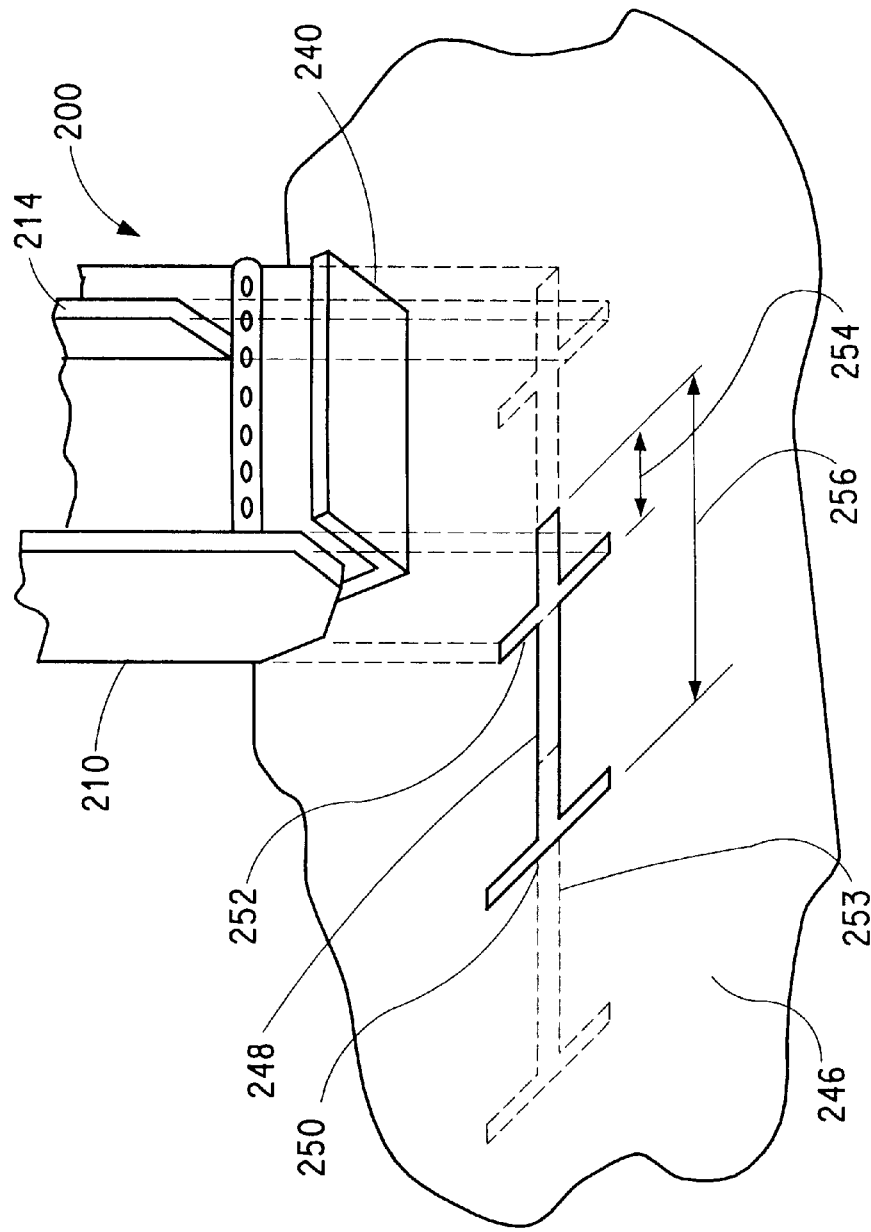
FIG. 10 is a partial perspective view of the mandrel alignment with a sub-wall of material.

FIG. 10 shows a portion of the top of the soil 246 where the mandrel 200 has been inserted. The mandrel has been removed and has left behind a first sub-wall 248 of, for example, a treatment wall in the soil. The top of the material making up the treatment wall sub-wall may actually be below the top of the soil, in which case 248 represents the hole left by the mandrel. The imprint of the guide rib 210 is seen at 250 and the imprint of guide 214 and its corresponding rib on the opposite side is seen at 252. The mandrel 200 is shown in a position for reinsertion into the soil adjacent the first sub-wall 248 and in a partially overlapping alignment with the first sub-wall as shown by the dashed lines. The guide rib 210 is shown aligned with the imprint 252 so a repeatable fixed overlap can be easily achieved when reinserting the mandrel 200. Alternatively, the reinsertion of the mandrel could be in the opposite direction indicated at dashed lines at 253 where guide rib 214 would be aligned with imprint 248 to achieve the aligned overlap. The material making up the first sub-wall of treatment wall will be pushed aside into the surrounding soil and surrounding treatment material when the mandrel is reinserted. The overlap length 254 is kept to a minimum, for example less than 25% of sub-wall length 256, to minimize the duplication of material to form an assembled treatment wall. The alignment of one treatment or electrode/treatment sub-wall with its neighboring sub-wall in the direction 216 (FIG. 9A) is important to make sure there are no "holes" in the wall so the contaminant escapes treatment. It is believed that by placing the guide rib 210 in the hole left by guide rib 214, (or vice versa) the mandrel will tend to follow the path made by guide rib 214 (or guide rib 210). This should be especially true when the emplaced material is a slurry material. This guiding combined with the overlap should minimize the possibility of "holes" in the walls when using the single-mandrel emplacement method.

The process for forming an assembled treatment wall, assembled electrode wall, or assembled electrode/treatment wall using a single-mandrel emplacement technique varies slightly depending on the type of soil, such as clay, silt, sand, peat, or combinations thereof. By clayey is meant the soil has predominantly clay-like characteristics, which includes being negatively charged and having a low permeability. In a clayey soil, the friction with the mandrel is excessive and there is a significant rebound force exerted by the soil. During insertion in clayey soils, a small amount of lubricant may be added to the leading end of the mandrel in the ground and some of this lubricant and entrained soil may rise to the surface of the ground and need to be collected and disposed of This is a relatively small amount of waste compared to the volume of soil that would be removed if all the soil equalling the volume of treatment or electrode material was dug up and removed. For instance, for a 12 cu ft volume of electrode material, about 25 gallons of water (3.3 cu ft of water) would be flushed from the soil during insertion of a mandrel 45 feet into the soil. This amount can be easily collected and treated separately. During withdrawal of the mandrel, there is some forceful rebound of the clayey soil which it is believed may decrease the hole dimension to a dimension about equal to the inside dimensions of the mandrel, so material placed inside a fully inserted mandrel is sufficient to fill the hole made by the outside of the mandrel after the soil has rebounded. For sandy soils, the mandrel can simply be driven into the soil without lubrication, and there is little forceful rebound of the soil after the mandrel is withdrawn. In this case more material is added to the hopper.

The process for forming an assembled treatment wall, assembled electrode wall, or assembled electrode/treatment wall from sub-walls of wall material using a single-mandrel emplacement technique is as follows. For the sake of explanation, the discussion will refer to formation of a treatment wall in a clayey soil, but will not be so limited. Referring to FIGS. 9A and 9B:

a shoe 240 is placed on the end of mandrel 200 and the mandrel and shoe are driven into the soil using the device of FIG. 5 to a depth that is just beyond the depth of the contaminated region in the soil to be treated;

water is fed under pressure through conduit 222 and exits holes, such as 226 and 228 at end 218 to lubricate the soil in contact with the mandrel as it is being driven into the soil, and the mix of soil and water forced up around the mandrel is collected for separate treatment;

a pre-measured amount of the flowable treatment material (based on expected soil rebound and desired treatment sub-wall length) is placed into the hopper 230 and flows down the tube 202 filling the tube;

the mandrel is withdrawn, the shoe is left in the soil thereby uncovering the end of the mandrel, and the flowable treatment material flows from the uncovered end of the mandrel and into the space left by the withdrawing mandrel, thereby forming a first sub-wall of treatment wall;

the mandrel is repositioned in a partially overlapping alignment with the first sub-wall as illustrated in FIG. 10 (where one guide rib is aligned with the imprint left by the other guide rib), and a new shoe 240 is placed on the mandrel 200 and the mandrel and shoe are forceably reinserted in the soil;

the mandrel is withdrawn, the shoe is left in the soil thereby uncovering the end of the mandrel, and the flowable treatment material flows from the uncovered end of the mandrel and into the space left by the withdrawing mandrel, thereby forming a second sub-wall of treatment wall;

the above process is repeated until the entire treatment wall assembly is completed. The result is a continuous planar treatment wall being formed with the removal of only a minimum amount of contaminated soil;

after the wall is formed, a porous fill, such as gravel, may be placed in the soil between the top of the soil and the top of the treatment material. The porous fill permits the placement of fluid directly into the wall to prevent dehydration if needed, keeps foreign material out of the wall, and blocks access of free oxygen from the wall if desired.

In the case of a sandy soil, the same procedure would be followed with the exception that no lubricating fluid is needed and it would be expected that no contaminated soil would need to be collected for separate treatment.

Although the treatment wall in FIG. 8 is shown in conjunction with electroosmosis electrodes, it is possible to employ the single-mandrel insertion technique and place planar treatment walls, or only a single wall, in a contaminated sandy soil where there is flowing groundwater, such as in an aquifer. In this case, flow induced by electroosmosis is not needed although it could be used to supplement the natural flow, assist with electromigration of difficult contaminants, or to help cleanse difficult strata in the soil.

Figure 11A:
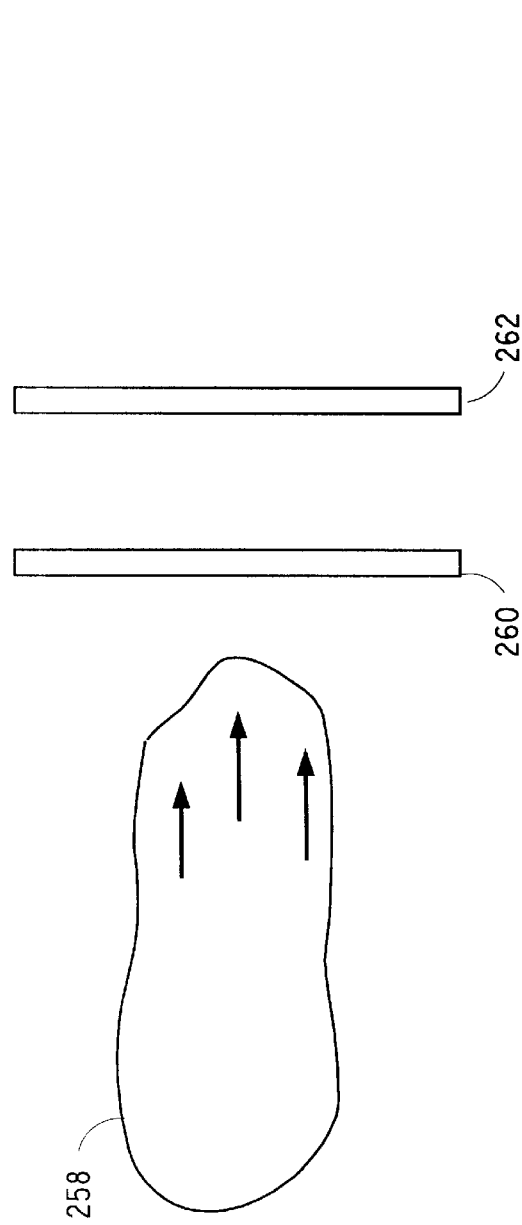
FIG. 11A is a plan view of a plume of contaminant approaching two treatment walls.

This arrangement is shown in FIG. 11A where the permeability of the aquifer is such that the contaminant is able to move through the aquifer in a particular direction thus forming a contaminant plume 258 due to a gravity induced pressure gradient. In this case, the single-mandrel emplacement system can be used to emplace a treatment wall 260 at the downstream side of the plume to intercept it and treat it. A second treatment wall 262 or further treatment walls can be used if the first treatment is insufficient or if several different treatments materials are desired.

In the case of organic contaminants it is frequently possible to treat the contaminant with iron filings or the like as described in U.S. Pat. No. 5,266,213 to Gillham, which is hereby incorporated herein by reference. In the case of treating the plume from a tailings impoundment, organic carbon may be used to treat the contaminant plume as described in U.S. Pat. No. 5,362,394 to Blowes et al. which is hereby incorporated herein by reference. The material of the treatment wall may be a flowable particulate material, such as cast iron particles mixed with the native soil or sand, or it may be in a slurry form. The nature of the material to be put in the soil depends on the nature of the contaminant which it is desired to treat. The treatment material may be active in the sense that it promotes or participates in a chemical or biological breakdown or transformation of the contaminant, or it causes the contaminant to adopt a less soluble form whereby it precipitates onto, or can be absorbed into the material. The treatment material may also function as a filter or absorber which may be dug up at some time. Materials which may be usefully employed as treatment materials are organic carbon (from a source such as wood chips, seaweed, or organic refuse), pyrite (ferrous sulphite) with or without calcite ($CaCO_3$). Other materials may be $Fe(OH)_3$, $MnO_2$, $FeS_2$, native iron, cast iron particles, elemental iron, activated carbon, and ion absorbing material, such as vermiculate. Treatment materials may also be selected from the group consisting of microorganisms, nutrients, electron acceptors, catalysts, chelating agents, ion exchange resins, buffers, salts and combinations thereof, as suggested by Brodsky et al in the '756 reference. The permeability of the treatment material should be about the same as the surrounding soil or one order of magnitude more than the surrounding soil if the length of the wall is to be minimized. If the permeability of the treatment wall is less than the surrounding soil, the wall will have to be longer than the width of the plume to present a greater area for the plume to flow through so the same mass per unit time of flow can be accommodated. A typical makeup of treatment wall for organic contaminants such as trichloroethylene is to provide about 60% by weight of 20 mesh cast iron particles in the mix with a soil or sand filler, in particulate or slurry form.

Figure 11B:
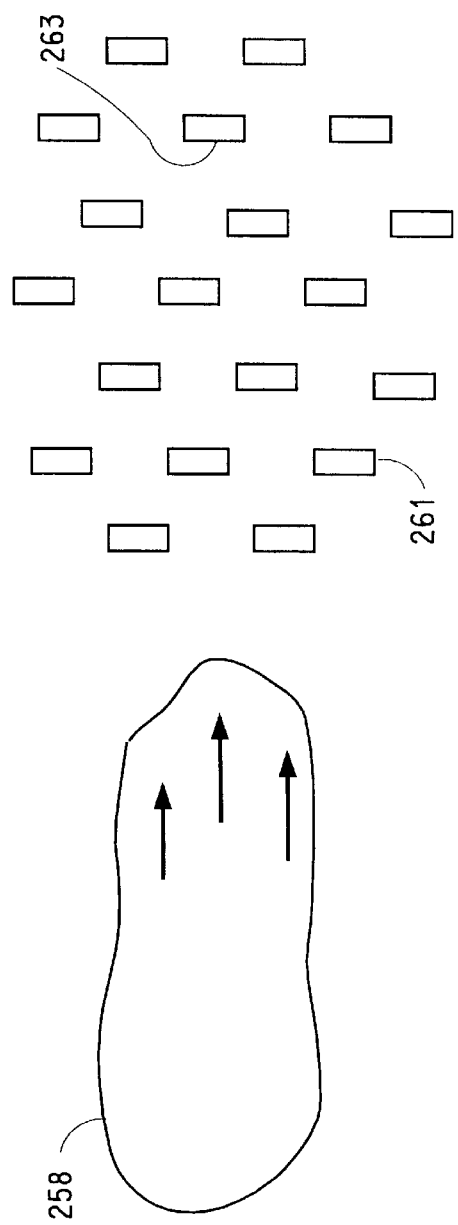
FIG. 11B is a plan view of a plume of contaminant approaching a plurality of spaced apart treatment sub-walls.

FIG. 11B shows another method of treating a contaminant in an aquifer where significant groundwater flow takes place. Instead of providing a continuous treatment wall as in FIG. 11A, the treatment sub-walls, such as sub-walls 261 and 263 can be distributed at spaced intervals in the path of the contaminant plume 258 in such a way that they block all straight paths for the plume. The sub-walls are spaced apart in both the direction of the path of the plume and in a direction across the path of the plume. This arrangement has the advantage that it can be quickly put in place using perhaps more than one mandrel insertion machine, since the sub-walls do not have to be precisely aligned and interengaged with one another. In this arrangement of treatment sub-walls, it is important that the permeability of the treatment material is greater than the surrounding soil so the groundwater with contaminants will tend to pass preferentially through the wall rather than through the spaces around the wall.

Figure 12:
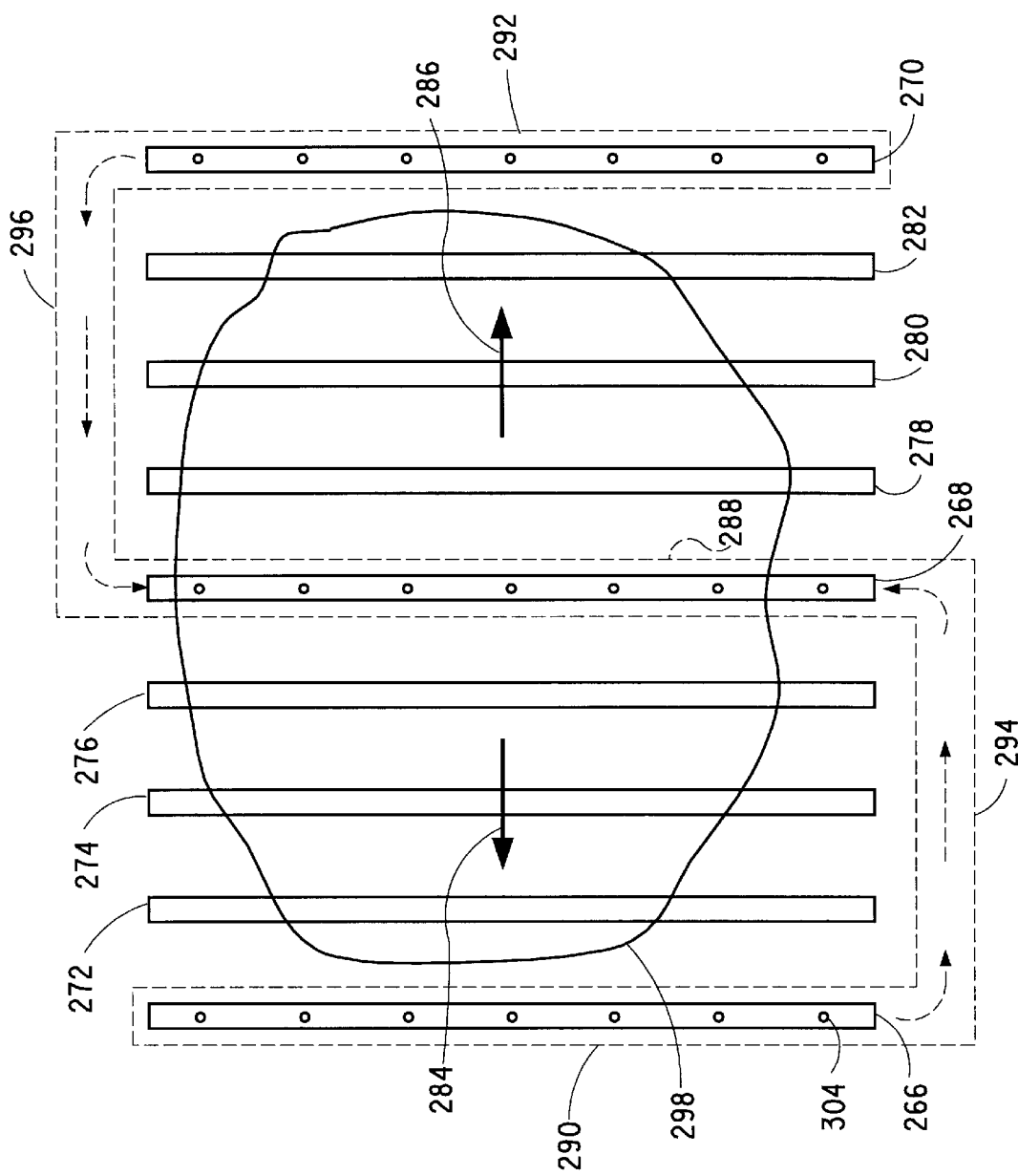
FIG. 12 is a plan view of an arrangement of electrode/ treatment walls and treatment walls.

In a clayey soil where significant gravity induced groundwater flow is too slow or is not possible, electrode walls need to be installed and electroosmosis used to drive the groundwater and contaminants through the treatment walls by electroosmotic flow and electromigration of contaminant ions that may oppose the fluid flow. FIG. 12 shows such an arrangement where a contaminated soil 264 needs to be treated in-situ. An arrangement of three combination electrode/treatment walls 266, 268, and 270 are combined with six treatment walls 272, 274, 276, 278, 280, and 282. The combination electrode/treatment wall has electrical connection rods, such as rod 304; these and the wall will be explained below. Electrode/treatment wall 268 would be a source electrode and electrode/treatment walls 266 and 270 would be sink electrodes so the electroosmotic flow would be from source electrode 268 through treatment walls 276, 274, and 272 in the direction of arrow 284; and from source electrode 268 through treatment walls 278, 280, and 282 in the direction of arrow 286. Circulation trench 288 would be provided at source electrode 268 and circulation trenches 290 and 292 would be provided at sink electrodes 266 and 270 respectively; these trenches could be filled with a porous material such as gravel to keep foreign material out of the wall, limit the access of free oxygen to the wall, and permit addition of fluids to the wall. Recirculation trench 294 connects trench 290 with trench 288, and recirculation trench 296 connects trench 292 with trench 288. Other means of recirculation are possible, such as having a connecting pipe or tube between the electrodes, pumping, or flooding the surface of the ground. Preferably, the recirculation fluid remains unexposed in the ground and is not removed. When starting up the electrode system, some fluid would have to be added to source electrode 268, but after operation is established fluid will be provided to source electrode 268 by fluid from sink electrodes 266 directed by trenches 290, 294, and 288; and by fluid from sink electrode 270 directed by trenches 292, 296 and 288. Since the fluid at the sink electrodes is commonly of opposite pH from the fluid at the source electrode, the recirculation of fluid as described serves to keep the fluid at the source electrode at a near neutral pH level, which is desirable as discussed earlier with respect to the panel electrodes. As mentioned previously, when discussing treatment walls used with panel electrodes, it may be desired to periodically reverse the polarity of the electrodes, or in this case the electrode/treatment walls. This may help minimize the development of osmotic and pH gradients, soil drying, and mineral precipitation that sometimes occurs at the electrodes. When switching the polarity, the fluid flow would reverse in the contaminant region and the trenches. If there is a pitch in the trenches to encourage flow in one direction, this would have to be taken into consideration, or separate trenches could be pitched in opposite directions providing for each flow direction.

The electrode/treatment walls are formed by the single-mandrel emplacement system as described for the treatment wall. The composition of the electrode/treatment walls varies somewhat due to special functional requirements. There is sometimes a need to place an electrode in the contaminated region or adjacent the contaminated region where it is desired to treat the contaminant in-situ and yet some portion of the contaminant arriving at the electrode has not yet been treated. This condition is present at sink electrode 266 where the fluid flow from the contaminated region at 298 has not passed through a treatment wall when it reaches electrode 266. This condition also exists at sink electrode 270. There is a need to provide some treatment of the contaminant in conjunction with providing an electrode so the fluid withdrawn from the sink electrode and recirculated to the source electrode is not highly contaminated. Other functional requirements for the electrode/treatment wall are that it readily conduct electricity without a large voltage drop along the length and depth of the electrode wall, and there is a means to attach a source of electrical potential to the wall.

To provide the special combination electrode and treatment functions for an electrode/treatment wall, a special mix is prepared of treatment material and conductive material. A typical electrode mix for a clayey soil is to provide a coke, treatment and filler mix where, for a conductivity of 20 times a typical clayey soil, the coke makes up about 45–65% by weight; and for a treatment material of iron particles, the iron particles would make up about 35–55% by weight. Preferably, the coke makes up 55–65% by weight of the composition and the remainder consist essentially of iron. It is believed that the iron, which has a 20 mesh particle size, may help achieve a good connection between the coke particles and connection rod, but it does not contribute appreciably to the electrode function after a period of time, since iron oxides may form and act to insulate the electrical properties of the iron particles. Other treatment material may be used in the mix depending on the contaminant to be treated and the selection of electrode material. By blending together the treatment and conductive materials in a homogeneous flowable mix, the single-mandrel emplacement method can be used which simplifies the emplacement and minimizes costs compared to separately placing an electrode wall immediately adjacent a treatment wall, or always enclosing the contaminant between treatment walls and spacing the electrodes farther apart outside the treatment walls.

One material which has been found to work well to provide high conductivity for an electrode wall or electrode/ treatment wall is to use a special coke material provided by Cathodic Engineering Equipment Company, Inc. of Hattiesburg, Miss. The material is called LORESCO type SWS carbon backfill which has a bulk density of about 68 lbs per cubic foot, a particle size where no particles are greater than 12.7 mm and 90% of the particles are between 1 mm and 5 mm, and a carbon content greater than 99% by weight. It may be coated with a surfactant to enhance wetting, it meets regulations governing buried products, and it is permeable to mitigate fluid passage. Other forms of clean coke may also be used. Other forms of conductive material to provide the electrode function are, for example, charcoal particles, dry ash, granulated carbon, graphite particles, or other carbon graphite particles which are suitable because of their chemical stability.

Electrical connections to the electrode/treatment wall can be made by inserting a steel rod (such as 1 inch dia. carbon steel) or tube conductive element at spaced intervals down through the material to a position at least halfway to the bottom of the wall (preferably close to the bottom of the wall) and leaving a portion of the rod or tube above the wall for connections. Typically, the conductivity of the electrode/ treatment wall should be such that the electrode is 20 times more conductive than the surrounding soil and the connections to the wall should be distributed within the electrode material so the voltage drop between connections should be less than 10% of the applied voltage. For a wall of 2 inches thickness and a rod separation of about 7 feet, the voltage drop between rods can be maintained less than 10% of the applied voltage if the wall conductivity is 20 times greater than the surrounding soil. The connection rod or tube may be placed in the mandrel before the electrode/treatment flowable material is placed in the mandrel at selected sub-wall positions in the wall. When this form of emplacement is used, the conductive element means may be an expanded metal or wire mesh of titanium that has a coating of iridium oxide, or of steel galvinized to resist corrosion; or stainless steel; or a steel plate or other form that can be placed inside the mandrel without blocking the flow of flowable material. Alternatively, the connection rod or tube may be driven down into the electrode/treatment material after it is in place in the wall.

Figure 13:
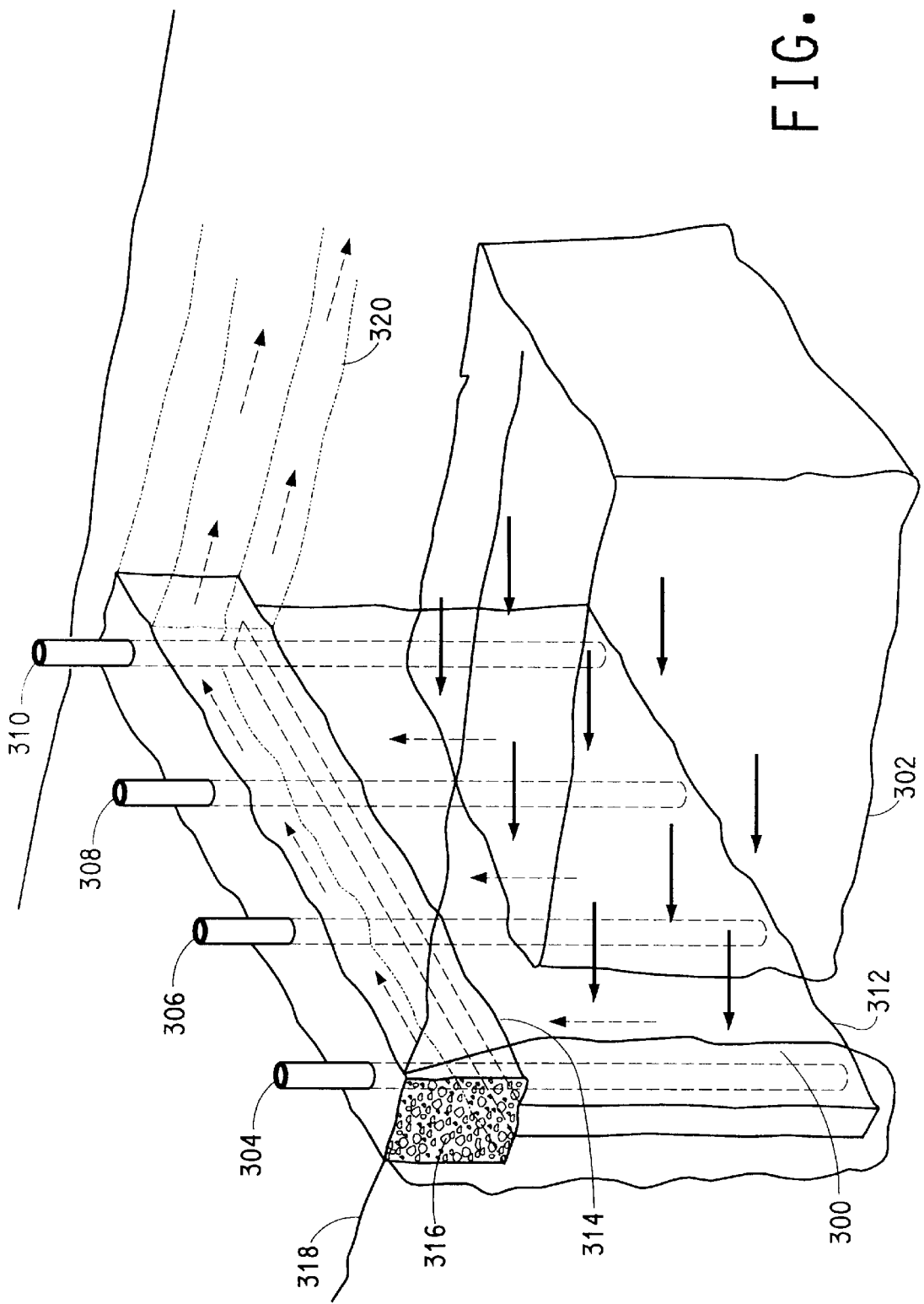
FIG. 13 is a perspective view into the soil of an electrode/ treatment wall.

FIG. 13 shows a perspective view through the soil of an electrode/treatment wall comprising a planar electrode wall 300 adjacent a contaminated region 302, and a plurality of conductive rods or tubes 304, 306, 308, and 310 that are inserted to the bottom 312 of wall 300. The rods extend through a circulation trench 314 that may be filled with a porous medium 316, such as gravel, and they extend above the surface 318 of the soil for ease in connecting a source of electrical potential (not shown). A recirculation trench 320, shown by dashed lines, may intersect the circulation trench 314. The recirculation trench may also be filled with porous media, or a conduit (not shown) may be inserted at the bottom of the trench. In case it is desired to provide some buffering solution to the electrode wall, it may be useful for the connections to the wall to be the tubular form so fluids can be supplied down the tubes to a position within the electrode wall. Additional tubes could be supplied to only reach to the top of the wall in the trench 314 to withdraw fluids from the electrode wall without circulating or recirculating in trenches 314 or 320.

In some cases in clayey soils, it is desirable to use a flowable material for the treatment walls and/or the electrode/treatment walls that is in the form of a slurry. The slurry material must be dense enough and viscous enough to resist the rebound force of the clayey soil after the mandrel is withdrawn and the slurry is in place. The material comprises treatment particles and a viscosifier, such as guar gum or clay, in a slurry mix where the concentration of treatment particles is about 30–70% by weight to accomplish the treatment function without waste of what may be an expensive treatment material, or compromising the ability to handle the slurry. When the treatment material is iron, it was found that at high concentrations the iron tended to settle out. Other viscosifier materials may be synthetic polymers or water-soluble polymers including hydroxypropyl guar, carboxy-methylhydroxypropyl guar, methylcellulose and hydroxyethylcellulose. The slurry mix should have a density which is greater than the surrounding soil to aid in resisting expulsion from the soil. Preferably, the density of the mix should be about 15–50% greater than the soil, and more preferably 20–40%. The viscosity can be increased sufficiently for most clayey soils by using a slurry of kaolinite clay and a treatment ingredient. The treatment ingredient for many organic contaminants would be granular iron that should pass a 20 mesh screen. This would be combined with a mixture of clay and water comprising 60% water and 40% clay by weight. The slurry should be about 55–65% by weight iron and 35–45% by weight water/clay mix.

The system of FIG. 8 may be altered to replace the separate electrode panels at rows 12 and 16 with flowable electrode walls instead. There need not be any treatment material combined with the electrode material if the contaminant is contained between the treatment walls as shown by dashed lines 322. In this case, the fluid reaching the electrode walls at rows 12 and 16 has already passed through at least one treatment wall, so additional treatment at the electrode is not required, even if it is desired to reverse polarity. The circulation and recirculation trenches of FIG. 12 would be added to handle the electroosotic fluid flow at the electrodes.

The system of using flowable materials for electrodes can be applied to the systems using electrode panels discussed earlier. For instance, in FIG. 8, the electrode panels in rows 12 and 16 may be replaced with individual flowable electrode sub-walls that are not connected into a single electrode wall assembly; each mandrel emplacement can be made to not overlap and a separate electrode connection means could be placed in each individual sub-wall for connection to an electrical source as shown for the panels. This could reduce costs by not having to fabricate electrode panels. Compared to a continuous electrode wall, it could reduce the amount of electrode material required balanced against the expense of additional connector rods and wiring to the electrical system. Likewise, the treatment panels in FIG. 6 in rows 114, 116, 118, and 120 could be replaced by flowable treatment materials directly inserted by the mandrel technique which may reduce costs by not having to fabricate treatment panels. This arrangement of individual overlapped treatment sub-walls would, however, consume more treatment material than providing a continuous treatment wall.

We claim:

1. A method of emplacing in soil a wall defining a plane or curved surface of flowable material containing electrode material, comprising the steps of:
   a) progressively forming a wall of flowable material by forming a plurality of overlapping sub-walls of flowable material arranged in a row, and emplacing the sub-walls in the soil while leaving the soil substantially in-situ;
   b) placing a plurality of conductive elements at spaced intervals into the wall and extending from the top of the wall to at least one-half the distance to the bottom.

2. The method of claim 1 wherein said progressively forming step comprises the steps of:
   i. forcibly inserting a mandrel into the soil;
   ii. placing a first sub-wall of flowable material within the mandrel;
   iii. removing the mandrel and leaving the first sub-wall of material behind in the soil;
   iv. forcibly re-inserting the mandrel into the soil adjacent the first sub-wall and in a partially overlapping alignment with the first sub-wall;
   v. placing a second sub-wall of flowable material within the mandrel;
   vi. removing the mandrel and leaving the second sub-wall of material behind in the soil, and;
   vii) continuing the mandrel insertion and placing of sub-walls until the wall is complete.

3. The method of claim 2 wherein placing a conductive element at a spaced interval comprises placing an element in a selected mandrel after insertion into the soil and before removing said selected mandrel.

4. A method of emplacing a planar treatment wall in soil, comprising the steps of:
   a) forcibly inserting a mandrel into the soil;
   b) placing a first sub-wall of flowable treatment material within the mandrel;
   c) removing the mandrel and leaving the first sub-wall of treatment material behind in the soil;
   d) forcibly re-inserting the mandrel into the soil adjacent the first sub-wall and in a partially overlapping alignment with the first sub-wall;
   e) placing a second sub-wall of flowable treatment material within the mandrel;
   f) removing the mandrel and leaving the second sub-wall of treatment material behind in the soil, and;
   g) continuing the mandrel insertion and placing of sub-walls until the treatment wall is complete,
   thereby progressively forming the treatment wall from a plurality of overlapping treatment sub-walls by emplacing the treatment sub-walls in the soil while leaving the soil in-situ.

5. A method of emplacing in soil a wall defining a plane or curved surface of flowable material, comprising: progressively forming a wall of flowable material by forming a plurality of sub-walls of flowable material arranged in a row; and emplacing the sub-walls in the soil using a hollow mandrel while leaving the soil substantially in-situ.

6. The method of claim 5, wherein the sub-walls have a width terminating in two opposed ends, the sub-walls are arranged end-to-end, with the end of one sub-wall spaced from an adjacent sub-wall by a distance of less than 100% of the width of a sub-wall.

7. The method of claim 6, wherein there is a second row of sub-walls emplaced as in claim 5, and the second row is staggered so the spaces between sub-walls in one row are aligned with the sub-wall width in the other row.

8. The method of claim 5, wherein the sub-walls have a width terminating in two opposed ends, the sub-walls are arranged end-to-end, with the end of one sub-wall abutting or partially overlapping the adjacent sub-wall to form a continuous wall free of holes.

9. The method of claim 8, wherein the flowable material is an electrode material for forming an electrode wall in the soil, and further comprising: placing a plurality of conductive elements at spaced intervals into the continuous wall and extending from the top of the wall to at least one-half the distance to the bottom.

10. The method of claim 5 wherein the flowable material is a material for treatment of contaminants in the soil to form a treatment wall in the soil.

* * * * *